United States Patent
Wang

(10) Patent No.: US 8,881,987 B2
(45) Date of Patent: *Nov. 11, 2014

(54) DATA COLLECTION DEVICE HAVING DYNAMIC ACCESS TO MULTIPLE WIRELESS NETWORKS

(71) Applicant: Hand Held Products, Inc., Fort Mill, SC (US)

(72) Inventor: Ynjiun P. Wang, Cupertino, CA (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/953,041

(22) Filed: Jul. 29, 2013

(65) Prior Publication Data
US 2013/0343368 A1 Dec. 26, 2013

Related U.S. Application Data

(60) Continuation of application No. 13/601,541, filed on Aug. 31, 2012, now Pat. No. 8,496,181, which is a division of application No. 12/779,369, filed on May 13, 2010, now Pat. No. 8,256,681, which is a division of application No. 11/369,185, filed on Mar. 6, 2006, now Pat. No. 7,717,342.

(60) Provisional application No. 60/712,037, filed on Aug. 26, 2005, provisional application No. 60/725,001, filed on Oct. 7, 2005.

(51) Int. Cl.
| | |
|---|---|
| *G06K 7/10* | (2006.01) |
| *H04W 76/02* | (2009.01) |
| *H04W 40/24* | (2009.01) |
| *H04W 84/20* | (2009.01) |
| *H04W 74/00* | (2009.01) |
| *H04W 40/28* | (2009.01) |
| *H04W 8/00* | (2009.01) |
| *H04W 88/04* | (2009.01) |
| *H04W 40/30* | (2009.01) |
| *H04W 40/12* | (2009.01) |
| *H04W 88/06* | (2009.01) |
| *H04W 88/08* | (2009.01) |

(52) U.S. Cl.
CPC ............ *H04W 40/246* (2013.01); *H04W 84/20* (2013.01); *H04W 76/023* (2013.01); *H04W 74/00* (2013.01); *H04W 40/28* (2013.01); *H04W 8/005* (2013.01); *H04W 88/04* (2013.01); *H04W 40/30* (2013.01); *H04W 40/12* (2013.01); *H04W 88/06* (2013.01); *H04W 88/08* (2013.01)
USPC .............. 235/472.01; 235/462.01; 235/462.25

(58) Field of Classification Search
USPC .............. 235/472.01, 462.01, 462.25, 462.46
See application file for complete search history.

(56) References Cited

U.S. PATENT DOCUMENTS 8,496,181 B2 * 7/2013 Wang ........................ 235/472.01

*Primary Examiner* — Ahshik Kim
(74) *Attorney, Agent, or Firm* — Additon, Higgins & Pendleton, P.A.

(57) ABSTRACT

There is set forth herein a method of providing network connectivity. The method can include introducing a new communication device within a communication range of a portable data collection device, the new communication device comprising a dynamic access module enabling the new communication device to receive data packets from the portable data collection device and route payload data of the data packets to an access point. In one aspect the new communication device can receive data packets from the portable data collection device and route payload data of the data packets to the access point if the new communication device determines that it is in range of both of said access point and the portable data collection device. There is set forth herein a system having a dynamic access module.

20 Claims, 15 Drawing Sheets

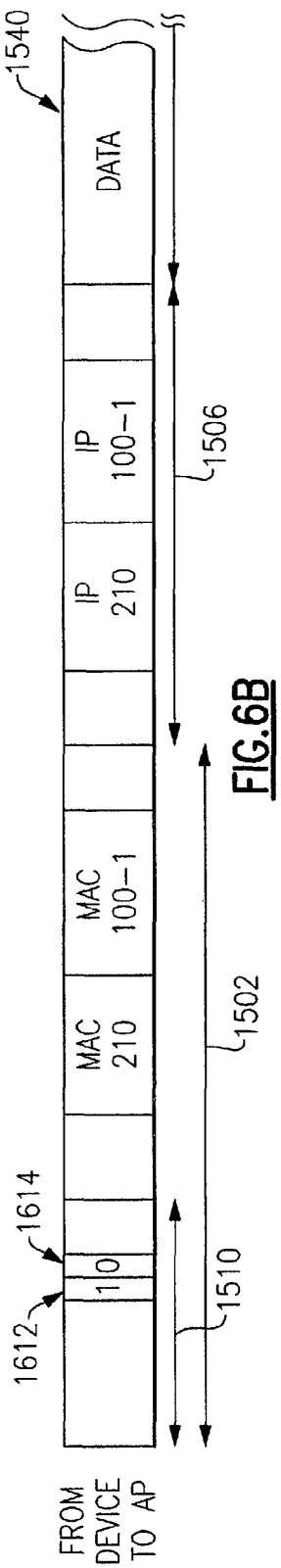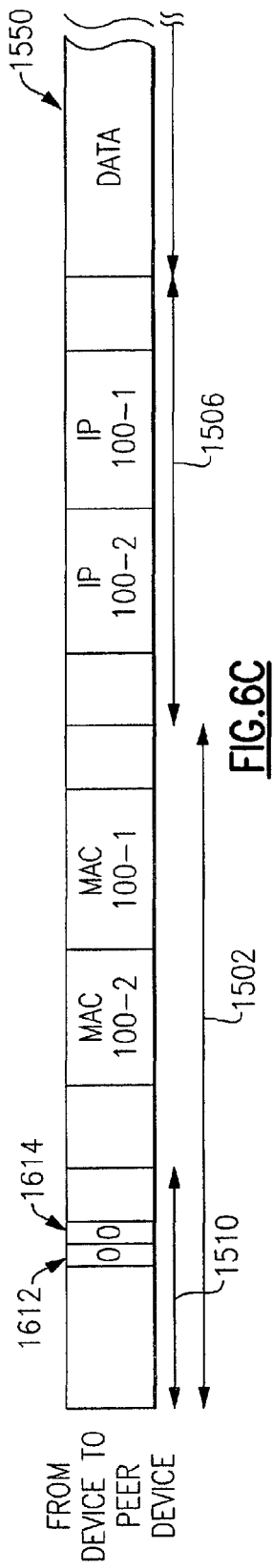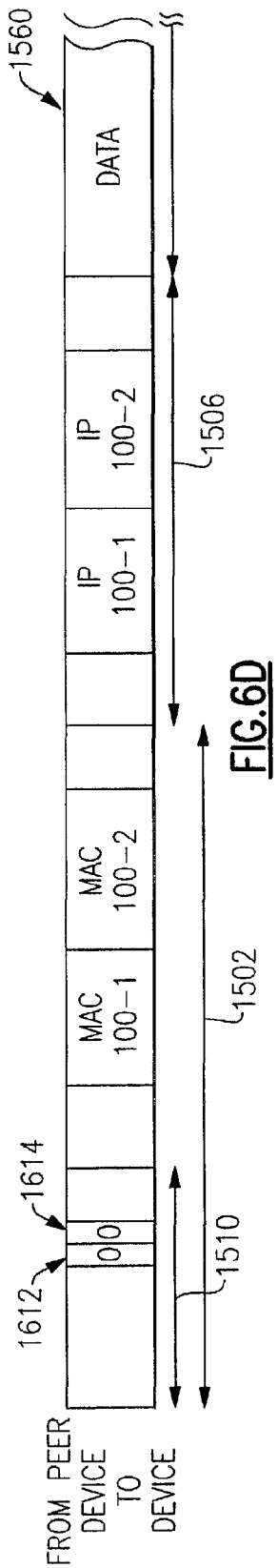

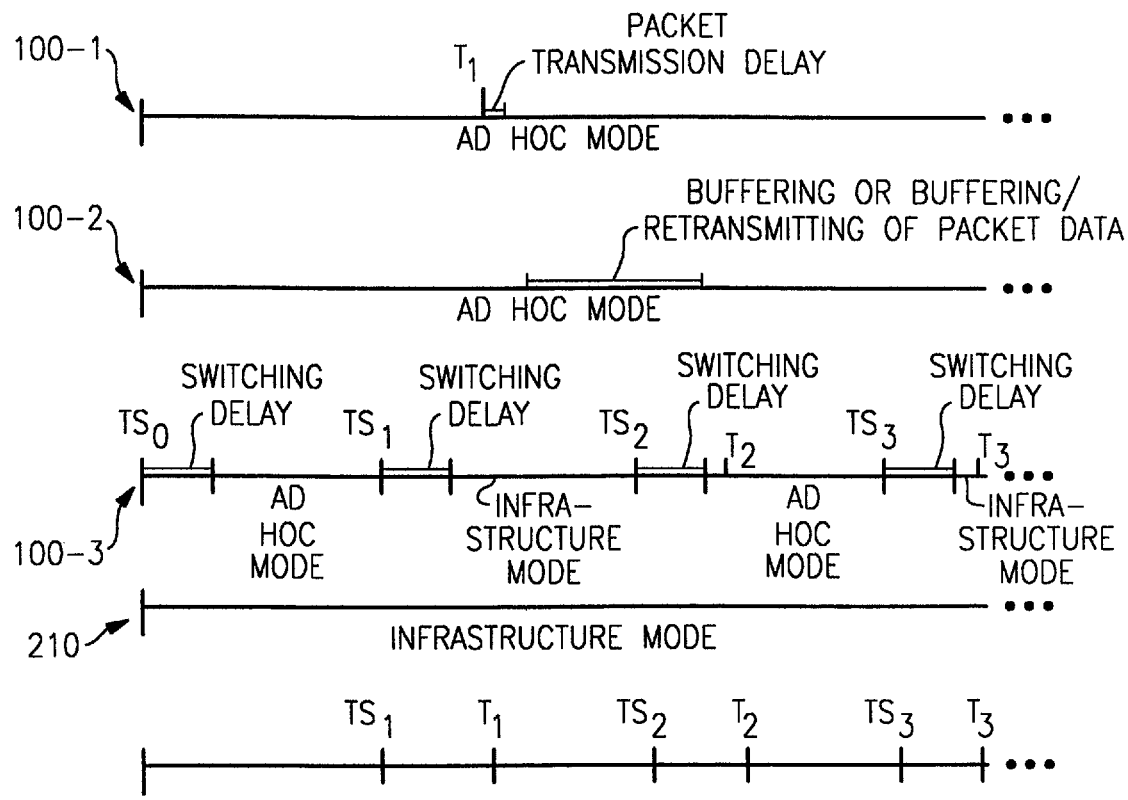

FIG. 7

| DATA TYPE | EMBODIMENT 1 - SO ROUTING ALGORITHM | EMBODIMENT 2 - SO ROUTING ALGORITHM |
|---|---|---|
| STREAMING VIDEO | LATENCY (ACTIVATE MODULE 1467) | LATENCY (ACTIVATE MODULE 1467) |
| STILL IMAGE | POWER AWARE (ACTIVATE MODULE 1468) | BIT ERROR (ACTIVATE MODULE 1469) |
| DECODED BAR CODE | BIT ERROR (ACTIVATE MODULE 1469) | POWER AWARE (ACTIVATE MODULE 1468) |
| DECODED RFID DATA | POWER AWARE (ACTIVATE MODULE 1468) | POWER AWARE (ACTIVATE MODULE 1468) |
| CREDIT CARD NUMBER | BIT ERROR (ACTIVATE MODULE 1469) | POWER AWARE (ACTIVATE MODULE 1468) |
| VOIP | LATENCY (ACTIVATE MODULE 1467) | LATENCY (ACTIVATE MODULE 1467) |

FIG. 13

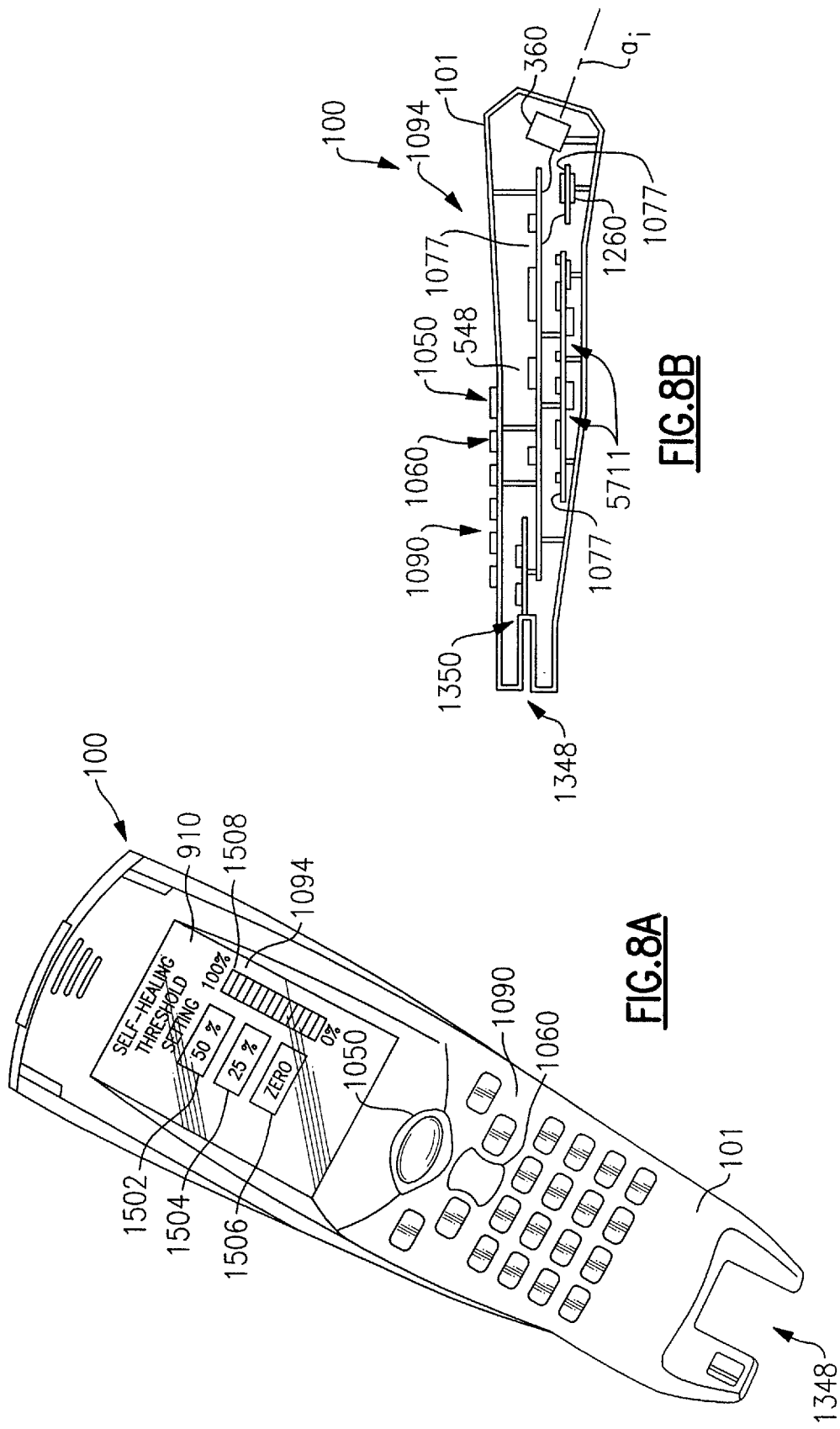

DATA COLLECTION DEVICE HAVING DYNAMIC ACCESS TO MULTIPLE WIRELESS NETWORKS

CROSS REFERENCE TO RELATED APPLICATIONS

The present application is a continuation of U.S. patent application Ser. No. 13/601,541, filed Aug. 31, 2012, entitled "Data Collection Device Having Dynamic Access To Multiple Wireless Networks," which is a divisional of U.S. patent application Ser. No. 12/779,369 (now U.S. Pat. No. 8,256,681), filed May 13, 2010, entitled "Data Collection Device Having Dynamic Access To Multiple Wireless Networks," which is a divisional of U.S. patent application Ser. No. 11/369,185 (now U.S. Pat. No. 7,717,342), filed Mar. 6, 2006, entitled "Data Collection Device Having Dynamic Access To Multiple Wireless Networks," which claims priority under 35 U.S.C. §119 of Provisional Application No. 60/712,037, filed Aug. 26, 2005, entitled "Data Collection Device Having Dynamic Access To Multiple Wireless Networks" as well as priority under 35 U.S.C. §119 of Provisional Patent Application No. 60/725,001, filed Oct. 7, 2005, entitled "Data Collection Device Having Dynamic Access to Multiple Wireless Networks." The priority of each of the above applications is claimed and each of the above applications is incorporated herein by reference in its entirety.

FIELD OF THE INVENTION

The invention is generally related to system and methods of data communication and is specifically related to a system and method of data communication in a data collection system having data collection devices.

BACKGROUND OF THE INVENTION

In recent years significant advances have been made in the art of data collection devices and networks containing the same.

In U.S. Pat. No. 5,900,613, a data collection device system is described having a data collection device adapted to read bar code data wherein the data collection device is in communication with a local host processor and a remote host processor. The data collection device of U.S. Pat. No. 5,900,613 is configured to report bar code data to a remote computer and execute reprogramming routines to receive program data either or both from the remote host processor and the local host processor.

In U.S. Pat. No. 6,298,176, a data collection device system is described having a bar code reading device and a host computer. The bar code reading device is equipped to send bar code data and associated image data to the host. The image data may contain digital images associated with transmitted bar code data. In one example described in U.S. Pat. No. 6,298,176, image data sent to a host includes image data representing a handwritten signature.

In U.S. Publication No. US2002/0171745, a data collection device system is described having a bar code reading device which is in communication with a remote computer. The bar code reading device sends image data and associated bar code data to a remote computer. In one combined bar code/image data transmission scheme described in the above patent application publication decoded bar code message data identifying a parcel is stored within an open byte header location of an image file including an image representation of the parcel.

U.S. Publication No. US2002/0171745, an image data file in .PDF, .TIFF, or .BMP file format is created at a data collection device which includes an image representation of a decoded bar code message and an image representation of the package including the bar code encoding the decoded message.

In U.S. Publication No. US2003/0132292, a data collection device is described having a data collection terminal including a bar code reading unit, an RFID reading unit, a mag stripe data reading unit, a chip card reading unit, and a fingerprint reading unit. The terminal is coupled to a network, which is configured to facilitate financial transactions involving data collected utilizing the various reading units.

As significant as the above developments are, shortcomings have been noted with the operation of presently available data collection devices and the systems in which they are incorporated. For example, while wireless data collection systems have proliferated, connectivity issues remain with such systems. In deploying a wireless data collection system a costly "site survey" is often commissioned to search for "dead zones" in work environments Dead zones are prevalent in many data collection work environments, particularly where obstructions to free radio wave propagation exist. Metal structures and water are known to obstruct the free propagation of radio waves. Since metallic structures (e.g., shelving, equipment including medical test equipment) and water (plumbing and piping) are common in data collection work environments, data collection work environments are often found to have numerous dead zones. Where a data collection work environment to be serviced by an IEEE 802.11 wireless communication system is found to have numerous "dead zones," the "solution" proposed by a site surveyor is often to integrate numerous additional access points into the system. The additional access points are costly and typically require connection to an expanded wire-line bus. In many data collection systems the number of integrated access points is equal or greater than the number of data collection devices.

Accordingly, there is a need for further advances in data collection devices and systems in which they are connected, and management of data collected utilizing such networks.

BRIEF DESCRIPTION OF THE DRAWINGS

Other objects and advantages of the invention will be apparent from the following description and drawings, in which:

FIGS. 6a-6d are diagrams illustrating construction of various data packets according to the invention;

FIG. 7 is a timing diagram illustrating timing in an illustrative multi-hop data packet transmission according to the invention;

FIGS. 8a and 8b illustrate an exemplary hand held portable data collection device housing into which all of the components of FIG. 1d may be integrated;

FIG. 13 is a table which may be utilized by a device according to the invention when operating in a mode in which a device activates one out of a plurality of self-routing algorithm modules based on the content of a data packet being transmitted.

DETAILED DESCRIPTION OF THE INVENTION

Figure 1A:
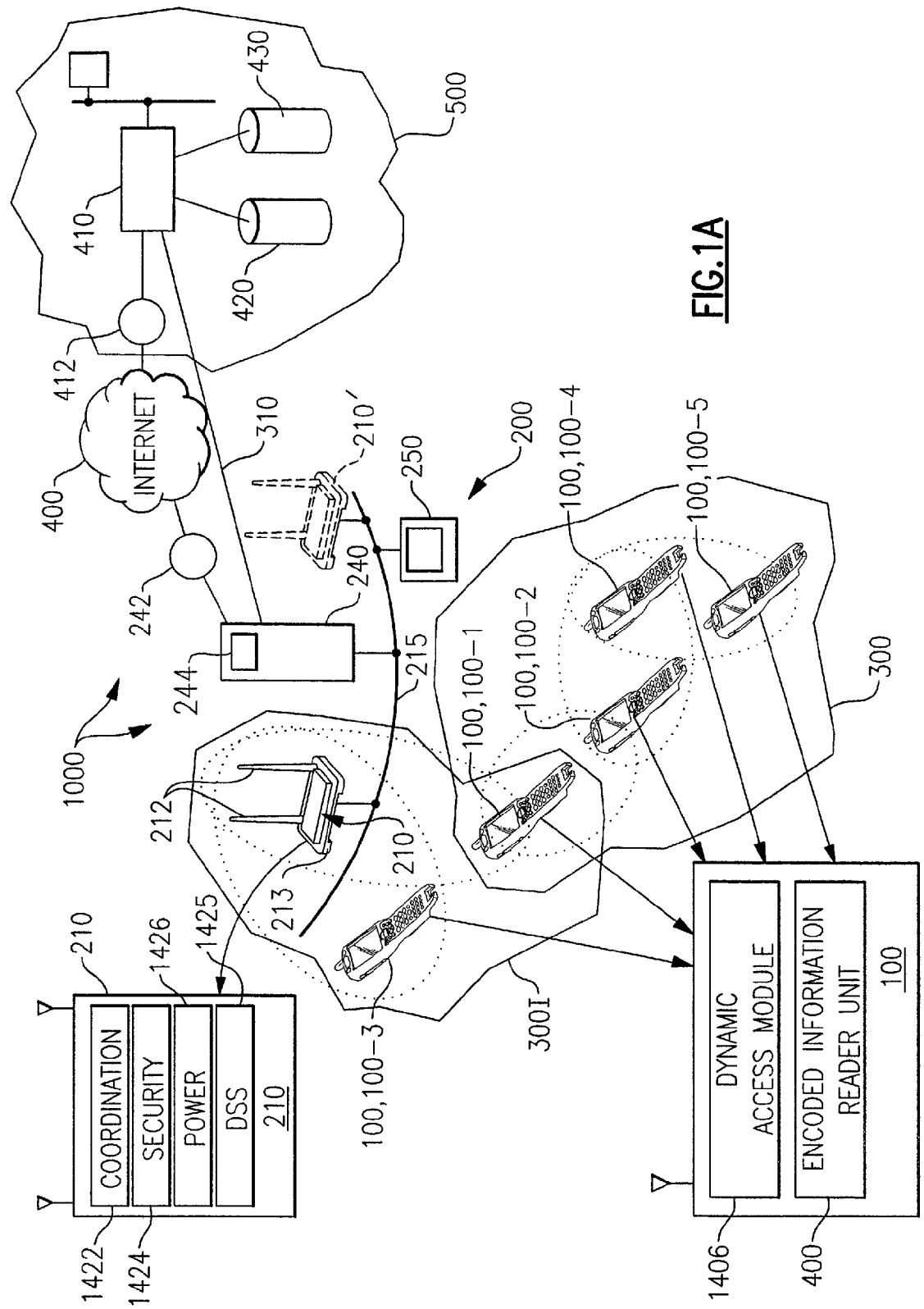
FIG. 1a illustrates a data collection system according to the invention.

According to a major aspect and broadly stated, the invention relates to a data collection system comprising a plurality of data collection devices and an access point. The access point can be wireline connected to a local server so that the access point provides access to local and remote server applications and databases. Each of the system's data collection devices can have an encoded information reader unit and a dynamic access module. The dynamic access module, among other functions, enables a data collection device to receive a data packet containing payload data from a peer device and transmit that payload data to a system access point and similarly receive a data packet containing payload data from an access point and transmit that payload data to a peer device.

An access point of a system of the invention may examine data packets of devices of a system according to the invention to determine whether a power save function has been selected, and if a power save function has been selected, may buffer data packets that are addressed to the device selecting the power save function.

A dynamic access module of each data collection device may include a linking component, a switching component, a self-healing component, and a self-routing component.

In accordance with the linking component of the dynamic access module, a data collection device according to the invention evaluates whether it is in range of an access point and in range of a peer device. If the data collection device determines that it is in range of an access point but not a peer device, communications between the data collection device and the access point are enabled and communications between the data collection device and peer devices are disabled. If a data collection device determines that it is in range of a peer device but not in range of an access point, communications between the data collection device and peer devices are enabled and communications between the data collection device and the access point are disabled. If the data collection device determines that it is in range of both an access point and a peer device, a switching component of the dynamic access module is activated to enable both communications between the data collection device and the system access point and between the data collection device and its peer devices.

In one illustrative embodiment of the invention, the system incorporates an IEEE 802.11 wireless network, including an IEEE 802.11 access point. IEEE 802.11 networks provide two major communication modes; namely, an infrastructure mode and an ad hoc mode. In general, when a device operates in the infrastructure mode, it is enabled to transmit to and receive data packets from an access point running in infrastructure mode but not a peer device. When a device operates in an ad hoc mode, the device is enabled to transmit and receive data packets from peer devices and access points running in ad hoc mode but not the access point running in infrastructure mode. According to the invention, where implemented in a wireless communication system in accordance with the IEEE 802.11 Standard, activation of the switching component of the dynamic access module causes a data collection device of the invention to dynamically (continuously) switch between communicating in an infrastructure mode and an ad hoc mode so that payload data of data packets received from a peer device in an ad hoc mode can be transmitted to an access point in an infrastructure mode and further so that payload data of data packets received from an infrastructure mode can be transmitted to a peer device in an ad hoc mode.

In accordance with a self-healing component of the dynamic access module, a data collection device monitors data throughput and activates a change in the present communication mode depending on the result of the monitoring. For example, if the device determines that throughput in a presently enabled mode is too low, the device may automatically activate an alternative communication mode such as infrastructure mode, ad hoc mode, or dynamic access mode (which is switching between infrastructure and ad hoc mode continuously).

In accordance with a self-routing component of the dynamic access module, each data collection device of a data collection device system incorporates a self-routing algorithm so that each device is equipped to participate in a self-organized network (SO). Where a plurality of portable or remountable data collection devices incorporate self-routing algorithms, long range data packet communications can be facilitated by deployment of a plurality of data collection devices that are in accordance with the invention in a data collection system with little or no reconfiguration of existing system equipment. When a plurality of data collection devices are deployed in a data collection system, multi-hop data communications may be supported between a device and a system access point where the device is out of range of the access point.

Referring to FIG. 1a, a portable data collection device 100 is incorporated into a data collection system 1000 including a plurality of networks 200, 300I, 300A, 400, and 500. Network 200 is a wireline local area network, network 300I is a wireless infrastructure network, network 300A is a local ad hoc network, network 400 is an IP network shown in the specific embodiment as the Internet and network 500 is a remote data archiving network managed by a data archiving entity. The data collection system 1000 includes a plurality of data collection devices 100-1, 100-2, 100-3, 100-4, 100-5 and network access point 210. The network access point 210 functions as a node within the wireline local area network 200 and as a node within the wireless infrastructure network 300I. The wireline local area network 200 also includes a server 240 and a plurality of computer devices such as a personal computer (PC) 250. As will be described more fully herein, wireless infrastructure network 300I in the specific illustrative embodiment of FIG. 1a includes access point 210, 210', device 100-1, and device 100-3 whereas ad hoc network 300A includes devices 100-1, 100-2, 100-4, 100-5. In accordance with the invention device 100-1 in the particular illustrative embodiment shown in FIG. 1a is enabled to function as a node within wireless infrastructure network 300I and as a node within ad hoc network 300A. System 1000 may also include a gateway 242 between network 200 and network 400 and a gateway 412 between network 400 and network 500. While different "networks" are designated herein, it is recognized that a single network as seen from the network layer 3106 of the OSI module (FIG. 3b) can comprise a plurality of lower layer networks, e.g., what can be regarded as a single IP network can include a plurality of different physical networks.

Referring to further aspects of the networks of data collection system 1000, network 500 is located remotely from the network 200 and can be located thousands of miles from network 200. Network 500, for example, can include a webpage server 410, which is in communication with various databases 420, 430. Network 500 can be in communication with network 200 via Internet network 400 or another communications path, such as a publicly accessible network, and/or through a private lease line, such as line 310.

In one embodiment of the invention, access point 210 of system 1000 is an access point in accordance with the IEEE 802.11 Standard, (i.e., in accordance with one of the 802.11, 802.11a, 802.11b, 802.11g, 802.11e, and 802.11i Specifications). Each device 100 of system 1000 can incorporate a radio transceiver in accordance with the 802.11 Standard, (i.e., in accordance with one of the 802.11, 802.11a, 802.11b, 802.11g, 802.11e, and 802.11i Specifications) and can have an associated unique Internet Protocol (IP) address. All devices 100 of system 1000 in range of access point 210 can share a common station service identification (SSID).

Referring to attributes of access point 210, access point 210 is wireline connected to server 240 via wireline bus 215 shown throughout the views and in communication with remote server 410 via network 400. Thus, communication with access point 210 provides access to all files and applications stored on server 240 or server 410. Access point 210 can be designed to have a large antennae 212 boosting the transmit and receive range and throughput of data through access point 210. Wireline bus 215 can be provided by e.g., an Ethernet cable, to form a backbone of the network 200.

Access point 210 can include coordination module 1422 which enables access point 210 to manage the receipt of data packets from several data collection devices. For example, the access point can coordinate the sending of clear to send (CTS) messages to each of several devices 100-1, 100-2, 100-3 so that each of several devices 100-1, 100-2, 100-3 are given different time slots in which to transmit data to access point 210 to the end that data collisions which might otherwise result from several devices communicating data packets to access point 210 simultaneously are avoided.

Access point 210 may also be implemented with enhanced security features, and can manage a system power conservation scheme. According to a security feature (e.g., the WEP feature, where access point is an 802.11 access point), access point 210 may incorporate security module 1424 which enables access point 210 to encrypt data packets transmitted to a device and decrypt data packets received from a device. In accordance with security module 1424 access point 210 may examine a control field of a received data packet to determine if a security feature (e.g., WEP) is enabled, and if it is enabled, decrypt the received data packet.

Referring to power management services, access point 210 can incorporate a power management module 1426. According to a power save function which can be managed by access point 210 in accordance with power management module 1426, access point 210 may examine control fields of received data packets to determine whether a transmitting device, e.g., device 100, 100-1 has requested a power save mode. If such examination indicates a power save mode has been selected, access point 210 may buffer data packets addressed to a device 100, 100-1, and send them at appropriate times when requested by device 100, 100-1.

In another aspect, access point 210 may include a Distribution Data Service (DSS) module 1428. The DSS module 1428 enables association with new portable data terminals that enter a communication range with access point 210. Access point 210 may be constructed to have high data throughput capacity and may be alternating current (AC) powered, making access point 210 impervious to battery failures.

As indicated by the view of FIG. 1a, the above access point processing modules may be incorporated in a portable housing 213, which is portable so that access point 210 may be moved from location to location within a system in which it is incorporated in order to optimize performance of access point 210. Access point 210 can be equipped with a suitable port 211 (e.g., an Ethernet connector port) which adapts access point 210 to be wireline connected to bus 215 of wireline network 200 so that when access point 210 is wireline connected to bus 215, access point 210 is wireline connected to network 200 and part of network 200 and further so that access point 210 is wireline connected to server 240 via wireline bus 215.

Figure 1B:
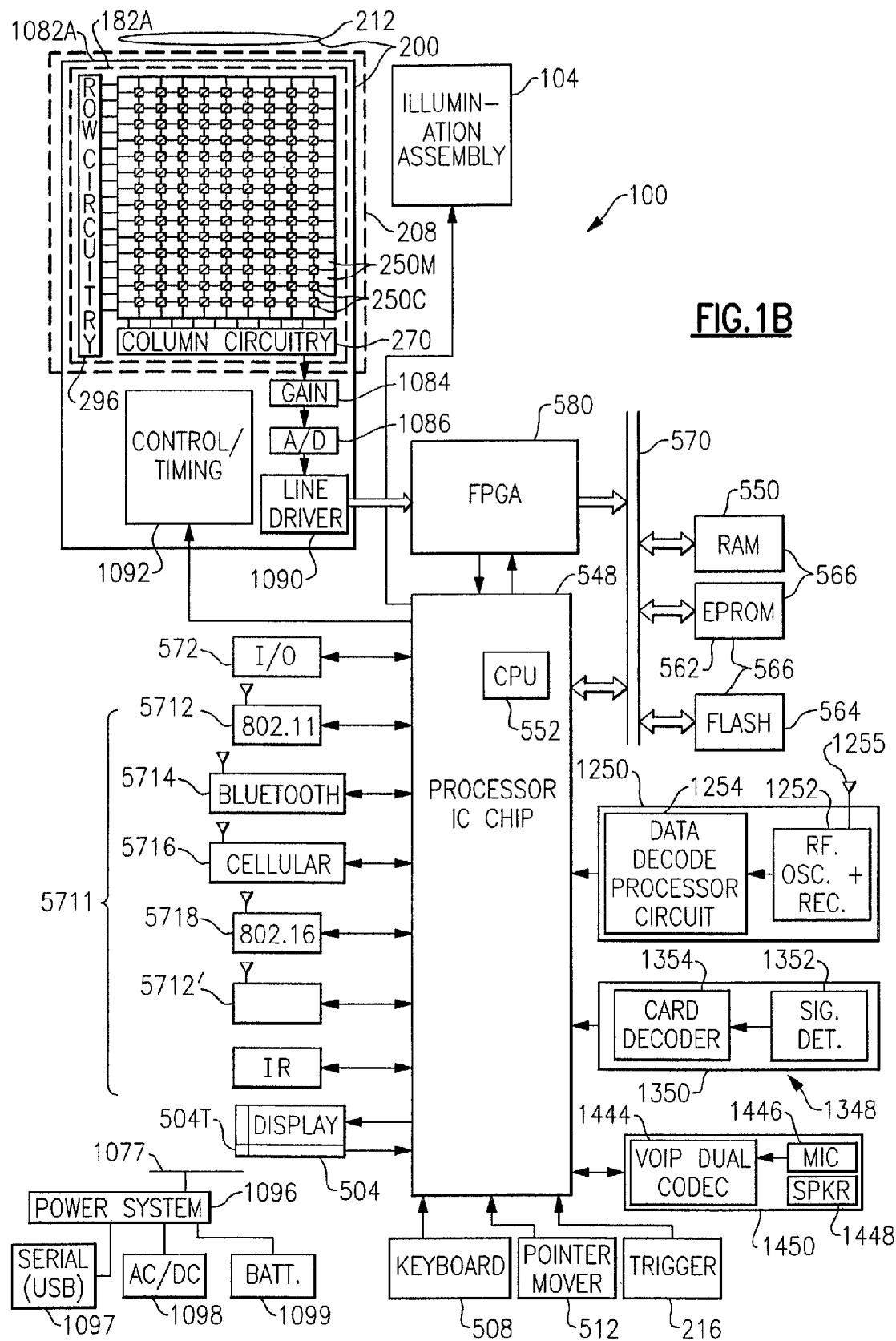
FIG. 1b is a block diagram illustrating electrical components which may be incorporated in a data collection device according to the invention.

Now referring to attributes of data collection device 100 in further detail with reference to FIGS. 1a and 1b, a data collection device 100 according to the invention can have a radio frequency communication interface block 5711, a dynamic access module 1406, and an encoded information reader unit 400. As will be described more fully herein, dynamic access module 1406 can be a software implemented processing module which, among other functions, enables a data collection device 100 to wirelessly receive a data packet containing payload data from a peer device 100 over a wireless transceiver and transmit that payload data to a system access point 210 and similarly receive a data packet containing payload data from an access point 210 and transmit that payload data to a peer device 100. Encoded information reader unit 400 can include one or more of a bar code reader unit, an RFID reader unit, and a credit/debit card reader unit. In the illustrative embodiment of FIG. 1b, an exemplary bar code reader unit is shown as being provided by an imaging assembly 200 and a control circuit 552 which manages the capture of image data into memory 566 and the subsequent decoding of image data in accordance with a symbology decoding program stored in memory 566. A bar code reader unit may also be provided by a product having dedicated decode circuit such as an IT 4XXX or IT 5XXX imaging module with decode out circuit as is available from Hand Held Products, Inc. of Skaneateles Falls, N.Y. An RFID reader unit 1250 in the illustrative embodiment of FIG. 1b comprises RF oscillator and receiver circuit 1252 and decode circuit 1254 while card reader unit 1350 includes signal detection circuit 1352 and card decoder 1354. A control circuit 552, which may be incorporated in a processor IC chip 548, may manage the control of various components of device 100, including one or more radio transceivers or RF block 5711. Components of exemplary data collection device 100 as shown in FIG. 1b are described in greater detail herein.

Figure 3A:
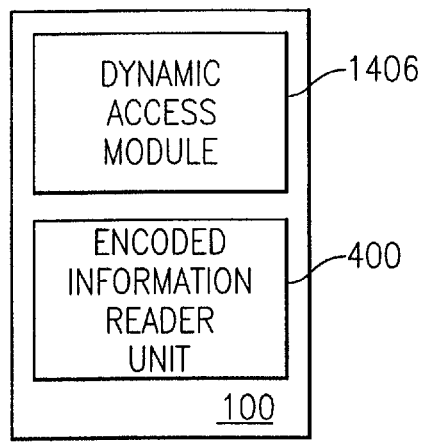
FIGS. 3a-3c are a series of diagrams for purposes of describing integrations of various processing modules in accordance with the invention.

Referring to aspects of dynamic access module 1406 in further detail with reference to FIG. 3a, dynamic access module 1406 of each data collection device 100 may include a linking component 1462, a self-healing component 1464, a switching component 1472, a self-routing component 1466 and a packet discrimination component 1480. The modules described herein, such as access point modules 1422, 1424, 1426, 1428, and dynamic access module 1406 of device 100 including component modules 1462, 1464, 1472, 1480, 1466, 1467, 1468, 1469, 1490 typically are provided by software programming of a programmable processing device, but may also be implemented with dedicated hardware circuitry or by a combination of software and dedicated hardware circuitry. In that the programming of a programmable processing device in a particular manner results in a specifically configured circuit being provided, processing modules described herein such as modules 1422, 1424, 1426, 1428, 1462, 1464, 1472, 1480, 1466, 1467, 1468, 1469, 1490 can alternatively be regarded as "circuits."

In accordance with the linking component of dynamic access module 1406 in one embodiment, data collection device 100 evaluates whether it is in range of an access point 210 and in range of a peer device 100. If data collection device 100 determines that it is in range of an access point 210 but not a peer device 100, communications between the data collection device 100 and the access point 210 are enabled and communications between the data collection device 100 and peer devices 100 are disabled. If a data collection device 100 determines that it is in range of a peer device 100 but not in range of an access point 210, communications between the data collection device 100 and peer devices 100 are enabled and communications between the data collection device 100 and the access point 210 are disabled. If the data collection device 100 determines that it is in range of both an access point 210 and a peer device 100, switching component 1472 of the dynamic access module 1406 is activated to enable both communications between the data collection device 100 and the system access point 210 and between the data collection device 100 and the peer devices 100.

Figure 2A:
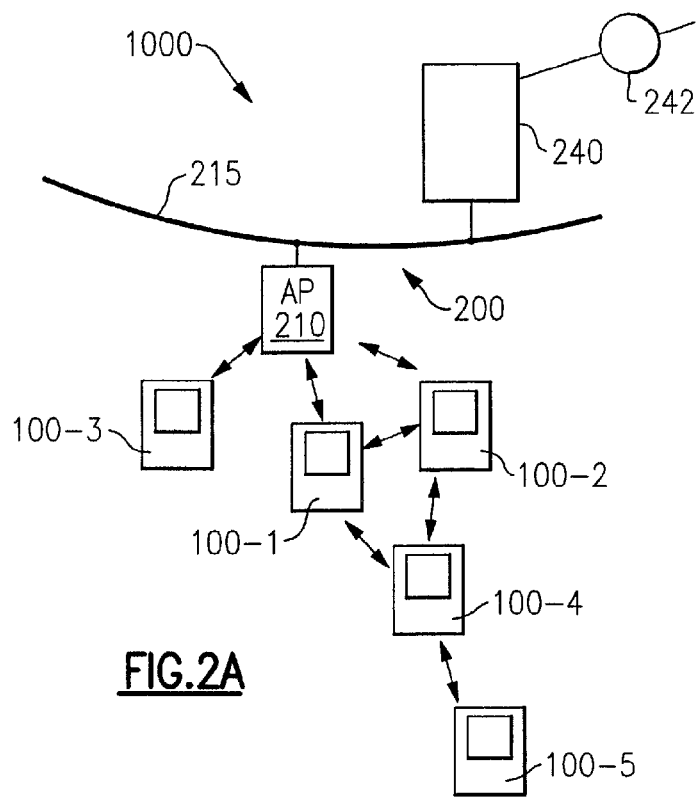
FIG. 2a is a system diagram illustrating a data collection system according to the invention wherein the presence of double arrows between a pair of spaced apart devices indicates that the devices are in connection range of one another.

System 1000 can incorporate an IEEE 802.11 wireless network, including an IEEE 802.11 access point 210, and devices 100 that incorporate one or more radio transceivers 5712, as shown in FIG. 1b, in accordance with the IEEE 802.11 Standard. IEEE 802.11 networks provide two major communication modes; namely infrastructure mode, as part of the Basic Service Set (BSS) available in and IEEE 802.11 network and ad hoc mode, as part of the Independent Basic Service Set (IBSS) available in an IEEE 802.11 network. In general, when a device 100 operates in infrastructure mode it is enabled to transmit and receive data packets from an access point 210 operating in infrastructure mode but not a peer device 100. In infrastructure mode, as is depicted in FIGS. 2b and 2c, all communications between devices 100-1, 100-2 are through access point 210, which operates as a bridge to broadcast data packets received. When device 100 incorporating an 802.11 radio transceiver 5712 operates in ad hoc mode, the device is enabled to transmit and receive data packets from peer devices 100 and access points 210 running in ad hoc mode but not an access point 210 operating in infrastructure mode. In ad hoc mode, as depicted in FIGS. 2d and 2e, data packets can be sent directly between peer devices 100. According to the invention, where implemented in a wireless communication system in accordance with the IEEE 802.11 Standard, activation of switching component 1472 of the dynamic access module 1406 causes a data collection device 100 of the invention dynamically (continuously) switch between communicating in infrastructure mode and ad hoc mode so that payload data of data packets received from a peer device in ad hoc mode can be transmitted to an access point in infrastructure mode and further so that payload data of data packets received from an access point in infrastructure mode can be transmitted to a peer device in an ad hoc mode.

Figure 4:
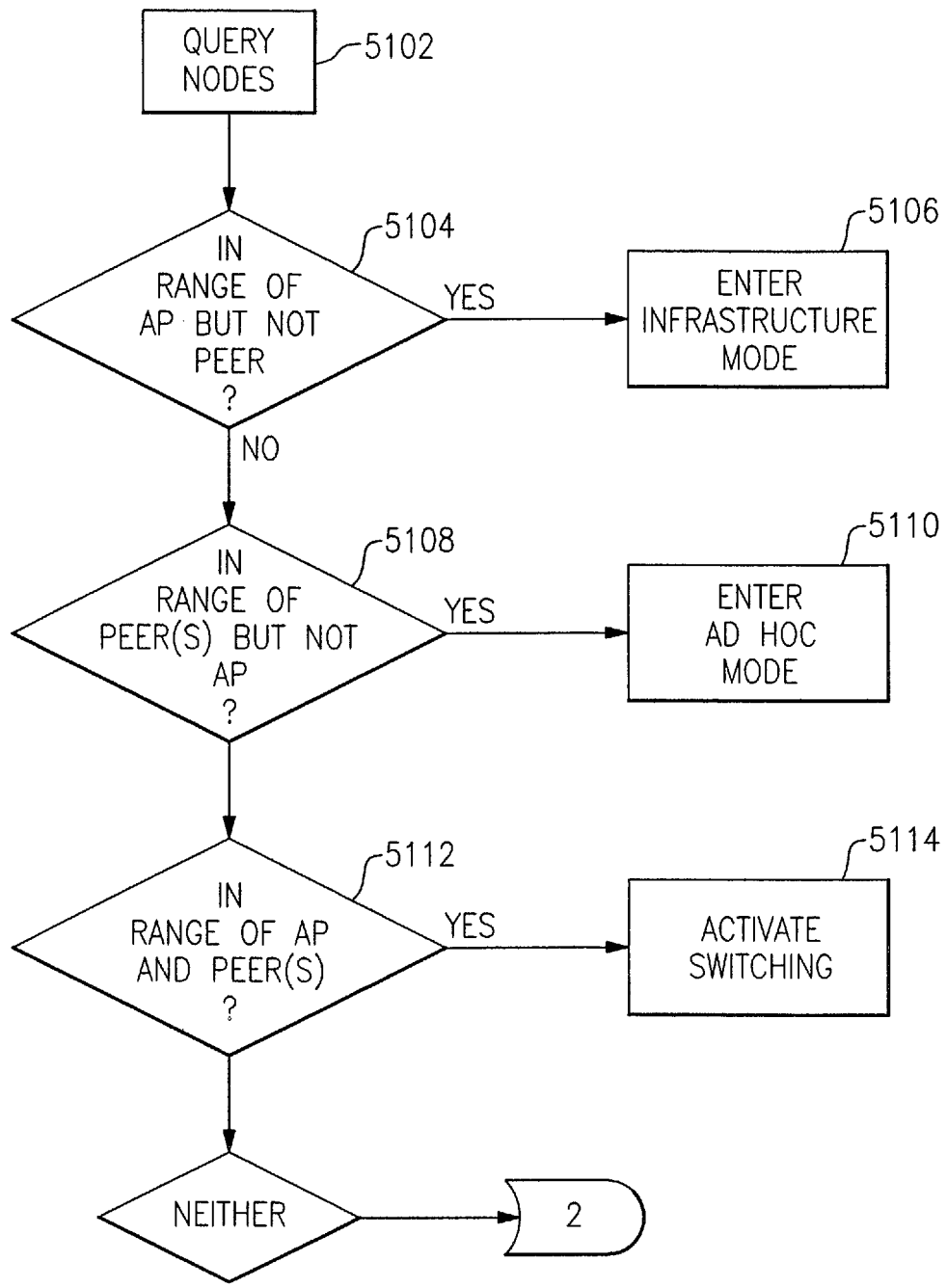
FIG. 4 is a diagram illustrating operation of a device operating in accordance with a dynamic access module according to the invention.

Functionality of a device 100 operating in accordance with linking component 1462 of dynamic access module 1406 is described with reference to the flow diagram of FIG. 4. At block 5102 data collection device 100 queries nodes of system 1000 via switching between infrastructure mode and ad hoc mode. If data collection device 100 at block 5104 determines that it is in range of access point 210 but not in range of a peer device 100, data collection device 100 commences operation in an infrastructure mode at block 5106 by joining a BSS network in range of device 100. If at block 5108 data collection device 100 determines that it is in range of a peer device 100 but not in range of an access point 210, data collection device 100 at block 5110 commences operation in ad hoc mode by joining an IBSS network in range of device 100. If at block 5112 data collection device 100 determines that it is in range of both an access point 210 and a peer device 100, data collection device 100 at block 5114 activates switching component 1472 to activate infrastructure/ad hoc mode network switching.

When network switching is activated, data collection device 100 continuously dynamically (continuously) switches between communicating in an infrastructure mode and ad hoc mode. The switching may be at fixed time intervals, e.g., as governed by the maximum packet transmission time or at variable time intervals. In an illustrative embodiment of the invention, device 100 operating in accordance with switching component 1472 dynamically switches between infrastructure and ad hoc mode at 100 ms intervals; that is, device 100 operates in infrastructure mode for 100 ms; switches to ad hoc mode; operates in ad hoc mode for 100 ms; switches back to infrastructure mode; operates in infrastructure mode for 100 ms and so on. In another illustrative embodiment, device 100 dynamically switches between infrastructure and ad hoc mode at 200 ms intervals. With network switching activated, data collection device 100 is enabled to receive data packets containing payload data from an access point 210 in infrastructure mode and transmit the payload data to a peer device 100 in ad hoc mode and is similarly enabled to receive a data packet containing payload data from a peer device 100 in ad hoc mode and transmit the data to an access point 210 in infrastructure mode. Further, in accordance with switching component 1472, device 100, while conducting switching may buffer data packet as is necessary and might reformat the data packet for data transmission.

In another aspect of switching component 1472 of dynamic access module 1406, a device 100 in switching mode (e.g., device 100-1 of FIG. 1a) sends data packets at certain times to access point 210 and to peer devices 100 that indicate to nodes of the system 1000 the timing of the switching. Specifically, just prior to ceasing operation in ad hoc mode, and prior to entering infrastructure mode, a device in dynamic switching mode (e.g., device 100-1, FIG. 1a) may send a data packet requesting a power save function. Peer devices 100 receiving the data packet may examine the data packet to confirm that a power save function is requested and can thereafter buffer data packets addressed to the switching device 100-1 (FIG. 1a). Just after entering infrastructure mode, device 100-1 (FIG. 1a) in switching mode can send a data packet to access point 210, requesting the sending of data packets buffered by access point and addressed to the switching device 100-1 (FIG. 1a). Just prior to ceasing operation in infrastructure mode and prior to reentering ad hoc mode, a switching data collection device 100-1 (FIG. 1a) can send a data packet to access point 210, requesting a power save function and thereafter access point 210 can buffer data packets addressed to the switching device. After reentering ad hoc mode, data collection device 100-1 (FIG. 1a) operating in dynamic switching mode can send a data packet to peer devices requesting sending of data packets buffered by the peer devices 100 and addressed to the switching device 100-1.

A set of rules governing operation of device 100 in accordance with linking component are summarized in Table A. Device 100 can be configured to operate in accordance with the linking rules of Table A when device is introduced to (initialized in) system 1000, i.e., when device is powered on in a position in range of a device 100 or access point 210 or is moved while in a powered-up state into a position in range of a device 100 or access point 210.

TABLE A

Linking Rules

1. Initialize data collection device 100 in infrastructure mode and detect whether there is an access point operating in infrastructure mode in range of the device.
2. Switch data collection device 100 to ad hoc mode and detect if the device is in range of a peer device.
3. If there is only an access point operating in infrastructure mode in range of data collection device 100, switch to infrastructure mode
4. If there is only peer device(s) in range of the device, switch to ad hoc mode
5. If both an access point and peer devices are in range of the data collection device, activate switching component 1472 to continuously switch between infrastructure mode and ad hoc mode.

With reference to system 1000 of FIG. 1a, wherein each of devices 100-1, 100-2, 100-3, 100-4, 100-5 incorporates dynamic access module 1406 having linking component 1462 operating in accordance with the linking rules of Table A, it is seen that device 100-3 is in range of an access point 210 only. Accordingly, device 100-3 communicates in infrastructure mode and is enabled to send to and receive data packets from access point 210 in infrastructure mode. Devices 100-2, 100-4, 100-5 are in range of a peer device 100 but not access point 210 and are, therefore, enabled to communicate in ad hoc mode. Devices 100 are enabled to communicate with peer devices 100-2, 100-4, 100-5 operating in ad hoc mode but not access point 210 (unless the access point is also operating in ad hoc mode and one of devices 100 enters the range of the access point 210). Device 100-1 is in range of both access point 210 and a peer device 100 and is, therefore, activated to switch continuously between infrastructure and ad hoc modes. Device 100 can be configured so that the process steps described relative to FIG. 4, and Table A can occur automatically, i.e., there need not be human intervention to cause processing to advance from a particular step to a next step.

The linking rules of Table A describe operation of device 100 when device 100 is first introduced into system 1000. However, over time, the relative positioning of devices 100 in system 1000 is expected to change. For purposes of illustrating the invention, the illustrative embodiment describing operation of the linking rules of Table A in connection with FIG. 1a assumes that each device 100 is introduced into system 1000 in the position indicated contemporaneously.

Figure 2F:
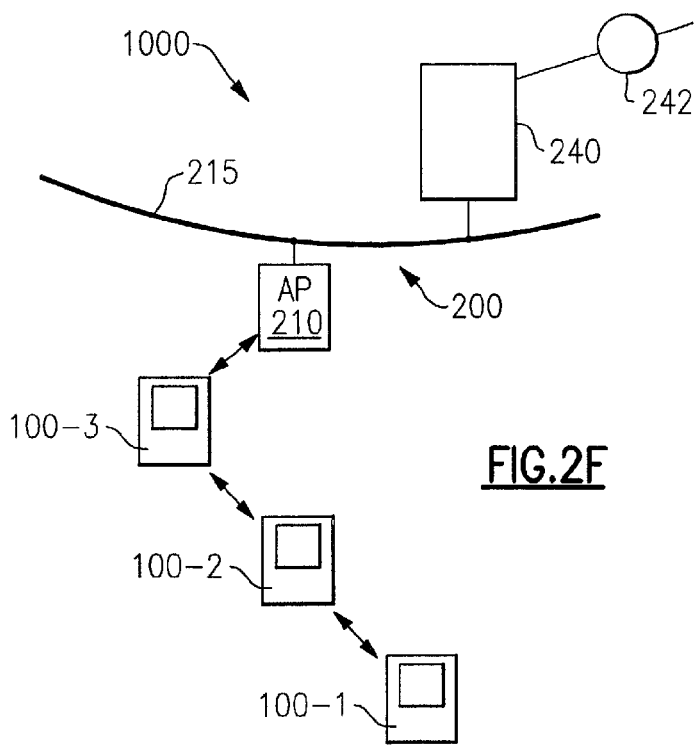
FIG. 2f is a system diagram illustrating a data collection system according to the invention wherein the presence of double arrows between a pair of spaced apart devices indicates that the devices are in connection range of one another.
Figure 2E:
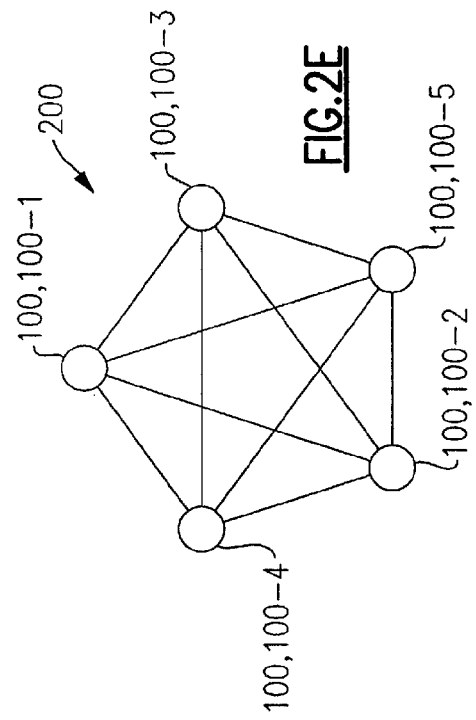
FIGS. 2b-2e are additional system diagrams illustrating aspects of the invention.
Figure 2D:
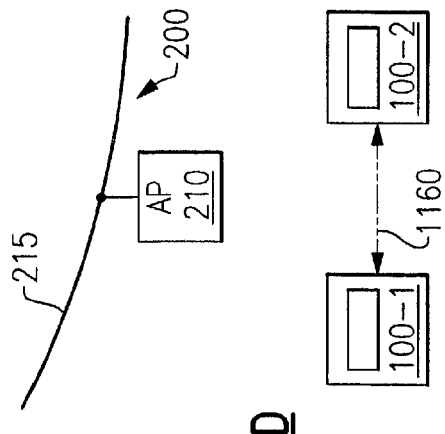
Figure 2B:
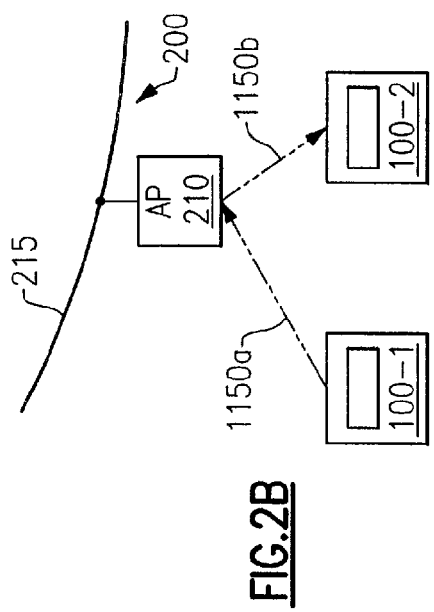
Figure 2C:
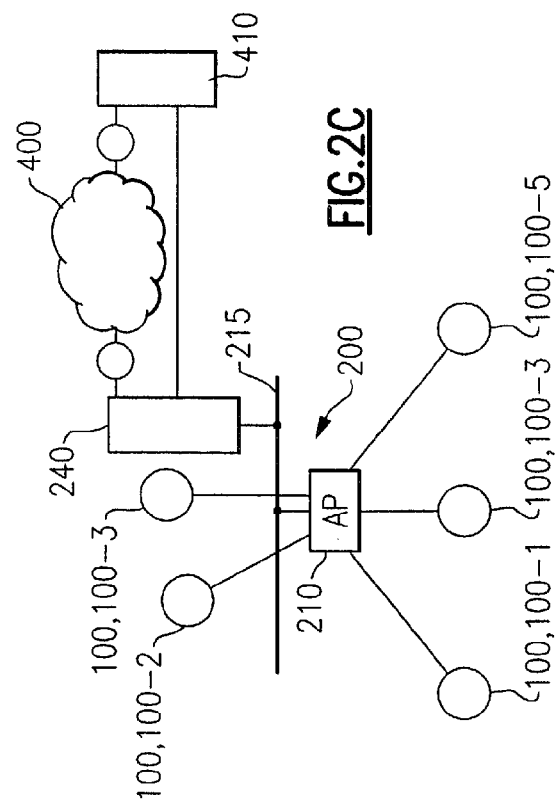

Referring to FIG. 2f, another illustrative embodiment of the invention is shown and described. In the illustrative embodiment of FIG. 2f, devices 100-3, 100-2, 100-1 each having dynamic access module and operating in accordance with the linking rules of Table A are introduced into system 1000 contemporaneously. System 1000 includes access point 210 which operates continuously in infrastructure mode and which is wireline connected to server 240. Introduced and initialized in the relative positions shown, with connectivity designated by double arrows (i.e., with device 100-3 in range of a peer 100-2 and access point 210, device 100-2 in range of peer 100-3 and peer 100-1 and device 100-1 in range of peer 100-2), device 100-3 operates in dynamic switching mode, while devices 100-2, 100-1 operate in ad hoc mode. Referring to the timing diagram of FIG. 7, time $TS_0$ designates a time when device 100-3 switches between infrastructure and ad hoc modes, time $TS_1$ designates a time at which device 100-3 switches from ad hoc to infrastructure mode, time $TS_2$ designates a succeeding switching time at which device 100-3 switches from infrastructure to ad hoc mode and time $TS_3$ designates a succeeding time at which device 100-3 switches to infrastructure mode. A data packet transmitted from device 100-1 and addressed to server 240 can be transmitted along the hop sequence 100-1, 100-2, 100-3, 210, 240. At time $T_1$ device 100-1 may transmit a data packet addressed to server 240. A self-routing algorithm of device 100-1 may resolve that the hop sequence is 100-1 100-2, 100-3, 210, 240. At time $T_1$, devices 100-1, 100-2 in accordance with the Table A linking rules, operate in ad hoc mode while device 100-3 in dynamic switching mode operates in infrastructure mode. Between times $T_1$ and $TS_2$ (the time that device 100-3 switches modes), data packets destined for device 100-3 can be buffered by device 100-2, or device 100-1. At time $T_2$ after switching to ad hoc mode, switching device 100-3 (FIG. 20 receives the previously buffered data packet data from device 100-2. Switching data collection device 100-3 buffers the data packet data until time $T_3$, a time after data collection device 100-3 switches back to infrastructure mode. At time $T_3$, while operating in infrastructure mode, data collection device 100-3 sends data of the received data packet to access point 210. At time $T_3$, switching device 100-3 operates in infrastructure mode to send data packet data to access point 210 also in infrastructure mode. It is noted that during the time of the multi-hop transmission of data along the hop sequence 100-1, 100-2, 100-3, 210, devices 100-1, 100-2 continuously operate in ad hoc mode without switching to infrastructure mode between times $T_1$ and $T_3$.

In accordance with a self-healing component 1464 of dynamic access module 1406, device 100 automatically monitors data throughput through device 100 and automatically changes a communication mode in response to the throughput monitoring. For example, in accordance with self-healing component 1464, device 100 can be configured so that if device 100 determines that data transmissions have dropped below a predetermined level, device 100 automatically switches communication modes (e.g., from infrastructure mode to ad hoc, from infrastructure to infrastructure/ad hoc switching mode, from ad hoc mode to infrastructure mode, from ad hoc mode to infrastructure/ad hoc switching mode, from infrastructure/ad hoc switching mode to infrastructure mode, from infrastructure/ad hoc switching mode to ad hoc mode). Device 100 can be configured so that the predetermined level of acceptable data throughput is operator selectable by an operator of device 100 or system 1000. Where device 100 is configured so that an acceptable level of data throughput is operator selectable, the data throughput level can be set to a non-zero level so that mode changing occurs when data throughput falls below the operator established threshold. Where device 100 is configured so that an acceptable level of data throughput is operator selectable, the data throughput level can be set to a zero so that mode changing occurs only when data throughput ceases (e.g., a network failure). Device 100 can be configured to carry out the steps described relative to self-healing component 1464 automatically, i.e., without human intervention to advance processing from a first step to a next step.

Referring to the view of FIG. 8*a*, device 100 can be configured so that a throughput threshold setting for device 100 is selected by clicking on an appropriate icon 1502, 1504, 1506 of graphical user interface 910 (GUI). A threshold can also be set utilizing a GUI selector bar 1508. GUI 910 can be created using an API of a closed standard operating system (e.g., WINCE) or with use of an appropriate windows manager for an open standard operating system where device 100 incorporates an open standard OS such as Linux. Available open standard windows managers include OPIE, QTOPIA, FVWM, and KDE. When icon 1502 is selected, a 50% of maximum throughput is set as the throughput threshold. When icon 1504 is selected, a 25% of maximum throughput is set as a throughput threshold. When icon 1506 is selected, the throughput threshold is set to zero so that device 100 will attempt to switch from its current mode (infrastructure, ad hoc, dynamic switching) only in the event of a network failure.

Figure 3B:
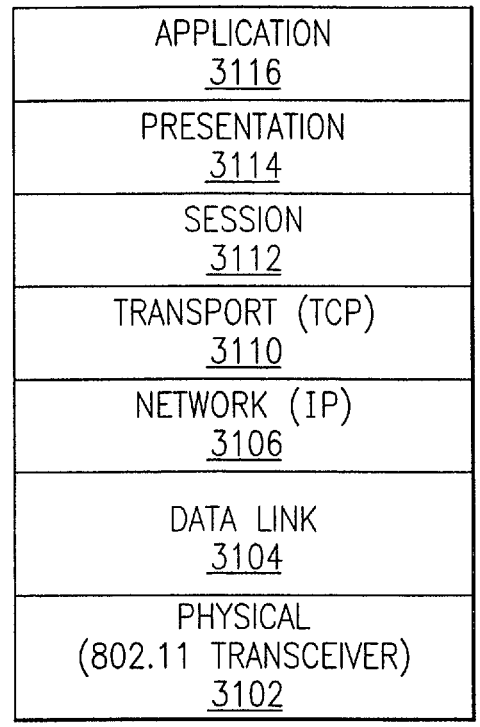

With reference to FIG. 3*b*, an OSI model diagram is shown for further description of the invention. According to the OSI network layer model, data protocols may be implemented in one of seven layers; i.e., the physical layer 3102 the link layer 3104, the network layer 3106, the transport layer 3110, the session layer 3112, the presentation layer 3114, and the application layer 3116. Dynamic access module 1406 which modifies the standard functioning of a NIC radio driver, can have several components, such as linking component 1462, self-healing component 1464, and switching component 1472 that can be regarded as being inserted in the link layer 3104 above the physical/Mac layer 3102. Commercially available operating systems provide application program interfaces (APIs) enabling programmers to alter radio drivers. For example, WINDOWS XP provides a Network Driver Interface Specification (NDIS) enabling programmers to custom define radio communication protocols and other drivers for a variety of processor interfacing devices. WINDOWS CE (WINCE) also provides an NDIS. Where device 100 incorporates a Linux kernel, a protocol driver for a radio of device 100 can be defined using an open source API such as "Linux Wireless Extensions."

In accordance with a self-routing component 1466 of the dynamic access module 1406, each data collection device 100 of a data collection device system 1000 can incorporate a self-routing algorithm so that each device is equipped to participate in a self-organized network (SO) such that where a plurality of portable or remountable data collection devices in ad hoc mode will automatically activate self-routing algorithms to form a Self-Organized (SO) network. The multi-hop data packet transmissions are supported between devices of the SO network.

Figure 3C:
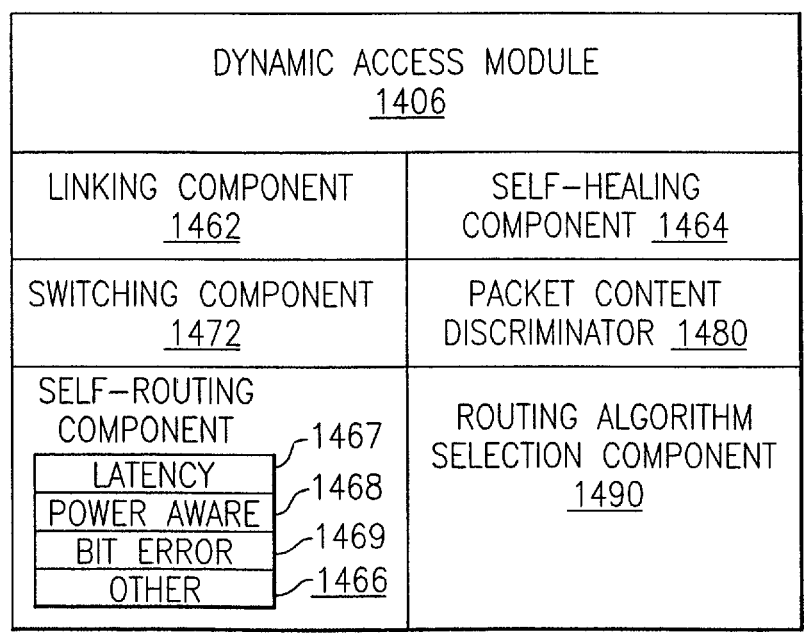

In one specific embodiment, self-routing component 1466 of dynamic access module 1406 is implemented using MESHNETWORKS SCALABLE ROUTING (MSR) protocol of the type available from MESHNETWORKS of Maitland, Fla. In another illustrative embodiment, SO service algorithms of the type available from GREENPACKETS, INC. are incorporated into devices 100. In a particular illustrative embodiment, self-routing component 1466 of each device 100 of system 1000 incorporates SONbuddy self-organized network routing algorithm software of the type available from GREENPACKETS, INC. of Cupertino, Calif. The Self Organized routing algorithms (SO services) of the data collection device 100 for implementation of the dynamic access module can be proactive, reactive, hierarchical, geographical, power aware, or multicast routing algorithms. The MSR protocol from MESHNETWORKS comprises elements of proactive and reactive routing. Available self organizing routing algorithms base routing on a variety of factors including such as signal strength, error rate, power consumption and availability, security concerns, quality of service (QOS) parameters, and latency (the time of transmission from a transmission mode to a destination mode). In the illustrative embodiment of FIG. 3*c*, dynamic access communication protocol module 1406 incorporates a latency based SO routing algorithm module 1467, a power aware SO routing algorithm module 1468, and a bit error rate SO routing algorithm module 1469.

When incorporating an SO routing algorithm module as part of self-routing component 1466, each data collection device 100 as shown in FIG. 1*a* can periodically broadcast one or more routing table data packets to one or more other data collection devices 100 which are in ad hoc mode or in dynamic access mode. Each data collection device of network 300A can also periodically receive one or more routing table data packets from neighboring peer devices 100 in connecting range of device. Routing table data packets that are transmitted and received by a device 100 can include metrics or other messages that enable device 100 to update a routing table stored in a memory of the device 100. A routing table can include network addresses of all or a subset of nodes within a self-organized network, such as network 300A shown in FIG. 1*a*. When data collection device 100 activates an on demand routing algorithm module, data collective device 100 can send a Route Request (RREQ) data packet and receive a Route Reply (RREP) data packet.

For larger SO networks, nodes of the network can be divided into "clusters" or "zones" and routing tables updated with routing table data packets broadcast and received by a data collection device 100 can include information characterizing the various clusters. In one illustrative embodiment, a designated first set of nodes 100 of network 300A can be designated to store complete routing tables, and a designated second set of nodes 100 can be configured to relay packet data to those nodes storing complete routing tables.

Referring to self-routing algorithm modules 1467, 1468, 1469 in greater detail, a device 100 operating with latency based routing algorithm module 1467 active can determine a routing path primarily based on which routing path out of a plurality of possible routing paths will yield the shortest transmission time for transmitting a data packet between a source node and a destination node. Device 100 operating with power aware routing algorithm module 1468 active can determine a routing path primarily based on which routing path out of a plurality of possible routing paths will increase the battery life of one or more devices of the self-organized network. Device 100 operating with bit error rate based routing algorithm module 1469 active can determine a routing path primarily based on which routing path out of a plurality of possible routing paths can be expected to yield the smallest bit error in transmitting a data packet between a source node and a destination node.

Aspects of latency based routing algorithms are described in various publications such as *A New Method to Make Communication Latency Uniform: Distributed Routing Balancing*, D. Franco, et al. of the Universitat Autònoma de Barcelona Department d'Informàtica, 1999, 10 pgs., Barcelona, Spain, *Adaptive Routing of QoS-Constrained Media over Scalable Overlay Topologies*, Gerald Fry, et al., Boston University Department of Computer Science, 2003, 28 pgs., Boston, Mass., *A Low-Latency Routing Protocol for Wireless Sensor Networks*, Antonio G. Ruzzelli, et al., Adaptive Information Cluster, Smart Media Institute in the Department of Computer Science at the University College Dublin, 2003, 6 pgs., Belfield, Dublin and *A Low Latency Router Supporting Adaptivity for On-Chip Interconnects*, Jongman Kim, et al., Department of Computer Science and Engineering at Pennsylvania State University, June 2005, 6 pgs., University Park, Pa., *Request For Comments: 1058—Routing Information Protocol*, C. Hedrick, Network Working Group, Rutgers University, June 1988, 33 pgs., *Request For Comments: 2453—RIP Version 2*, G. Malkin, Network Working Group, Bay Networks, November 1998, 39 pgs. and *Internetworking Technologies Handbook: Routing Information Protocol*, Cisco Systems, Inc., Third Edition, Cisco Press, Dec. 1, 2001, pp. 47-1-47-5, Indianapolis, Ind. Aspects of power-aware based routing algorithms are described in various publications such as *Online Power-Aware Routing in Wireless Ad-hoc Networks*, Qun Li, et al., Department of Computer Science at Dartmouth College, 2001, 10 pgs., Hanover, N.H., *Power-Aware Routing in Mobile Ad Hoc Networks*, Mike Woo, et al., Department of Electrical and Computer Engineering at Oregon State University and Aerospace Corporation, 1998, 15 pgs., Carvallis, Oreg. and El Segundo, Calif. and *Fair Coalitions For Power-Aware Routing in Wireless Networks*, Ratul K. Guha, et al., Department of Engineering and Applied Science, Computer and Information Science, and Electrical Engineering at the University of Pennsylvania, Jul. 20, 2004, 21 pgs., Pennsylvania. Aspects of bit error rate routing algorithms are described in such publications as *Congestion-Optimized Multi-Path Streaming of Video Over Ad Hoc Wireless Networks*, Eric Setton, et al., Information Systems Laboratory in the Department of Electrical Engineering at Stanford University, 2004, 4 pgs., Stanford, Calif. and *Minimizing Distortion for Multi-Path Video Streaming Over Ad Hoc Networks*, Eric Setton, et al., Information Systems Laboratory in the Department of Electrical Engineering at Stanford University, 2004, 4 pgs., Stanford, Calif.

In one illustrative embodiment, latency based routing algorithm module 1467 for enabling device 100 to participate in a self-organized network can incorporate a simple, low overhead distance-vector protocol implementing features seen in protocols such as the Routing Information Protocol (RIP). Operating in accordance with RIP, a source device 100 receives routing table data packets indicating the number of hops between various nodes of network 300A, and determines a lowest latency routing path for a source to destination data transmission on the basis of which path yields the fewest number of hops. Referring to system 1000 as shown in FIG. 1*a*, any given node, such as device 100-4 of network 300A can receive a routing table data packet including metric information from its neighbor peer devices 100-2, 100-5 describing the hosts (e.g., node 100-1 for device 100-2) that each neighbor, 100-2, 100-5, can reach and how many hops will be required to reach the hosts from devices 100-2, 100-5. Host 100-4 will then insert the destination hosts, e.g., host 100-1 into its routing table, and include peer neighboring devices (e.g., device 100-2 for destination node 100-1) as the next node on the path to the destination, and include a total distance d, which will be the number of hops to the destination. Eventually, every node 100-1, 100-2, 100-4, 100-5 of the self-organized network 300A will store in a memory thereof a table of all destinations that it can possibly reach. All nodes can periodically send routing table data updates to their neighbors with entries for all possible destinations and the distance. In accordance with RIP, nodes 100 can be configured to request updates. If a device 100 receives a routing table data packet message with a destination that is already in a routing table, then a simple comparison is made and the path with the shortest distance is entered. A timeout value for certain paths can be included to help smooth transitions and updates for a changing topology. A device 100 can send a routing table data packet including a message indicating that that some nodes are unreachable.

Accordingly, the routing information of the device routing tables can change when devices 100 are added to or deleted from system 1000, or when a location of the one or more of devices 100 of the system 1000 changes. The data collection device 100 can route data packets according to a particular route described within routing table information stored within it.

Addresses of local server 240 or remote server 410 may or may not appear on any of the routing tables of devices 100 that incorporate dynamic access module 1404. Where system 1000 is configured so that server addresses do not appear on device routing tables, packets addressed to servers 240, 410 are transmitted to a device operating in dynamic switching mode (e.g., device 100-1, as shown in FIG. 1*a*) which serves as a default gateway for packets addressed to destinations outside of the SO network 300A.

As indicated, the incorporation of self-routing component 1466 into devices 100 facilitates multi-hop data packet transmissions across multiple peer devices. With reference again to system 1000 of FIG. 1*a* every data collection device has access to (i.e., can receive data transmissions to and from local server 240 and remote server 410). In data collection systems, it is important that data collection device 100 have constant access to applications and data bases of local server 240 and remote server 410. For example, data collection devices 100 may make repeated requests for price information from a price lookup table (PLU) stored in server 240 or server 410 utilizing bar code decoded data. Data collection devices 100 may also repeatedly send credit/debit account information to remote server 410 for purposes of requesting authorization of a credit transaction. In shipping and inventory applications, data is repeatedly sent for archiving and tracking to a remote server 410. In retail store applications, customer number information may be repeatedly sent to remote server 410 which is configured to respond with customer specific data such as customer targeted advertising messages.

Referring again to the system of FIG. 1*a*, device 100-3 is in range of access point 210 only. Accordingly, device 100-3 will operate in infrastructure mode and be in communication with access point 210 which also operates in infrastructure mode. Device 100-1, in range of both an access point 210 and a peer device 100, operates in a dynamic switching mode. Operating in a dynamic switching mode, device 100-1 is able to send and receive data packets to and from access point 210 operating in infrastructure mode and is able to send and receive data packets from peer devices operating in ad hoc mode. Device 100-2 is in range of a peer device 100 only. For data communications between device 100-2 and server 240, data packets can be transmitted forwardly and backwardly along the hop sequence 100-2, 100-1, 210, 240. Data collection devices 100-4, 100-5 are also in communication with peer devices 100 only and not access point 210 and, therefore, operate in ad hoc mode. Because devices 100 in accordance with self-routing component 1466 incorporate self-routing algorithms, devices 100-4, 100-5 are nevertheless in communication with server 240, and server 410. For data communications between device 100-5 and server 240, data packets can be transmitted forwardly and backwardly along the hop sequence 100-5, 100-4, 100-2, 100-1, 210, 410.

In another useful embodiment, system 1000 is devoid of a management module for synchronizing infrastructure/ad hoc switching between several devices. The inventor discovered that by incorporating a linking component in accordance with the linking rules of Table A into each of several devices and equipped each of the several devices with self-routing functionality, each device 100 remains in communication with each other node of system 1000 without the incorporation of a management module to synchronize infrastructure/ad hoc mode switching of several devices.

Referring to the system diagram of FIG. 2*a*, the system of FIG. 2*a* is similar to the system of FIG. 1*a* except that at the time of initialization, device 100-2, like device 100-1, is in range of both an access point 210 and a peer device 100. In accordance with the linking rules of linking component summarized in Table A, both device 100-1 and device 100-2 will be in a mode in which they continuously switch between an infrastructure mode and an ad hoc mode. It will be seen that under certain circumstances, the devices in a dynamic switching mode may not be synchronized (e.g., device 100-1 may be in ad hoc mode at the time that device 100-2 is in infrastructure mode or vice versa). Nevertheless, in spite of possible desynchronized conditions, all devices 100 of system 1000 remain in communication with one another. For example, where a data packet transmitted from a first device 100-2 in dynamic switching mode is addressed to a second device 100-1 in a dynamic switching mode the data packet transmission request may be carried out with a single hop transmission along the path 100-2, 100-1 provided switching of the devices is synchronized such that the ad hoc operation times of the devices overlap for sufficient time to facilitate the packet transmission. It is also seen with reference to the system view of FIG. 2*a* that system 1000 can be configured so that a data packet transmitted by a first device 100-1 in dynamic switching mode and addressed to a second device 100-2 in a dynamic switching mode can be routed to second device 100-2 even where the switching of the two devices is not sufficiently synchronized to facilitate a single hop data packet transmission. In accordance with the invention, system 1000 can be configured so that a packet transmitted from device 100-1 addressed to device 100-2 can be routed by default along the path 100-1, 210, 100-2 where direct transmission along the path 100-1, 100-2 is not possible due to network desynchronization and where access point 210 incorporates routing functionality. In accordance with linking rules of Table A, switching desynchronization cannot prevent data transmissions between devices 100-4, 100-5 out of range of access point 210 since, according to the linking rules, devices 100-4, 100-5 in range of a peer device 100 but out of range of an access point 210 are caused to operate in ad hoc mode continuously and do not attempt to switch out of ad hoc mode unless switching is driven in response to throughput monitoring. Accordingly, it can be seen that a highly functional and flexible system can be created without incorporating a high overhead synchronization management module into system 1000.

Operation of self-healing component 1464 and self-routing component 1466 of dynamic access module 1406 is further described with reference to the illustrative embodiment of FIG. 1*d*, wherein data collection system 1000 includes two access points 210, 210'. Remaining components of the system 1000 of FIG. 1*d* are as described in connection with FIG. 1*c*. The connectivity of each device is 100 illustrated with double arrows (the presence of a double arrow between devices indicates that the devices are in a connection range distance). In normal operation, data packets addressed to server 240 or server 410 propagate through access point 210 or access point 210'. In normal operation, with all nodes functioning, devices 100-1 and 100-2 (FIG. 1*d*) are in range of access point 210 and operate in infrastructure mode. Devices 100-1, 100-2 are also in range of at least one of peer devices 100-4 and 100-5, but, in the specific embodiment described are not initially connected to peer devices 100-4, 100-5 since, at the time of initialization, devices 100-4, 100-5 were not in range of either of devices 100-1, 100-2. Devices 100-14 and 100-15 are in range of a both an access point 210' and a peer device 100 and operate in dynamic switching mode. Remaining data collection devices 100 of system are in range of a peer device only and therefore operate in ad hoc mode.

The operation of self-healing component 1464 is illustrated further when considering the case of a failure of access point 210. When access point 210 fails, data throughput through devices 100-1 and 100-2 (FIG. 1*d*) drops. Devices 100-1 and 100-2 in accordance with self-healing component 1464 can automatically monitor their respective data throughputs and may switch their operating modes to ad hoc mode. Notwithstanding the failure of access point device 210, data collection devices 100-1, 100-2 build a new connection to server 240 and server 410 through access point 210'. Devices 100-1 and 100-2 build a new connection to server 240 since (1) by switching to ad hoc mode in response to a throughput drop, device 100-1 becomes connected to device 100-4 and device 100-5 and (2) by switching to ad hoc mode, device 100-2 becomes connected to device 100-5. Further, through operation of a self-routing algorithm module 1266, multi-hop data transmissions are supported between devices 100-1 and 100-2 and an access point 210'. It is seen that packets which prior to failure of access point 210 would have been transmitted along the hop sequence 100-2, 210, 240, may instead be transmitted along the hop sequence 100-2, 100-5, 100-8, 100-13, 100-14, 210', 240 by operation of self-healing component 1464 and self-routing component 1466 which together enable device 100-2 to build a connection between device 100-2 and device 100-5 upon the failure of access point 210, and to establish a multi-hop data communication path between device 100-2 and server 240.

In another illustrative embodiment, it is seen that incorporation of dynamic access module 1406 into devices 100 of system 1000 can greatly establish the ease with which connectivity is established. With reference again to system 1000 of FIG. 1*d*, assume again that access point 210 fails but that devices 100-13, 100-12 have not been introduced into system 1000 (FIG. 1*d*) at the time of failure of access point 210'. At the time of failure, device 100-14 in range of access point 210' only at the time of initialization operates in infrastructure mode, device 100-15 in range of access point 210' and peer 100 at the time of initialization operates in dynamic switching mode, and device 100-16 in range of a peer device only at the time of initialization operates in ad hoc mode. It is seen that when device 100-12 is introduced into system 1000 in the position shown wherein all devices 100 incorporate dynamic access module 1406 and operate in accordance with the linking rules of Table A, a data communication path is established to enable data packets transmitted by devices 100-1, 100-2 addressed to server 240 to reach server 240 (i.e., through the hop sequence [100-1 or 100-2], 100-5, 100-9, 100-10, 100-12, 100-15, 210', 240). Further, an alternative path to server 240 is created by introducing into system 1000 device 100-13 in range of device 100-8 and device 100-14 as shown. Device 100-14 is initialized in infrastructure mode, and, in accordance with the embodiment of dynamic access module 1406 described may not originally be in communication with device 100-13. Nevertheless, packets transmitted by device 100-13 and addressed to server 240 may be transmitted along the hop sequence 100-13, 100-8, 100-9, 100-10, 100-12, 100-15, 210', 240 notwithstanding a lack of a communication link between device 100-13 and device 100-14. Further, a communication link between device 100-13 and device 100-14 may be established by manually activating switching of device 100-14 by adjusting the throughput threshold of device 100-14 using GUI 910 as described in connection with FIG. 8*a*. Specifically, if the throughput threshold level is adjusted to a significantly high level, device 100-14 in accordance with self-healing component 1464 can switch to dynamic switching mode to establish connectivity with device 100-13, and to thereby establish the possible hop sequence 100-13, 100-14, 210', 240. In addition to representing a retail store, the view of FIG. 1*d* can represent a shipping warehouse, and a patient care center such as a hospital.

The invention therefore is in one aspect is a method for repairing a network connection in a retail store data collection system having an access point 210 wireline connected to and being part of a wireline network 200, the wireline network including a wireline bus 215 and a local server 240, and where the access point can buffer data packets destined for devices requesting a power save function, the method including the step of providing dynamic access module 1406 in a plurality of data collection devices 100, and introducing (e.g., by powering up or by physical movement) a new device 100 into the system 1000 at a certain position such that the new device 100 is in connection range of both of first and second device nodes 100 of the system 1000, and wherein the first and second device nodes 100 are not in connection range of one another, wherein the second node is connected to the local server 240, so that a network connection is established between the first node and the server 240 by introduction of the new device at the certain position.

The invention in another aspect is a method for repairing a network connection in a shipping warehouse data collection system 1000 having an access point 210 wireline connected to and being part of wireline network 200, the wireline network including a wireline bus 215 and a local server 240, and when the access point can buffer data packets destined for devices requesting a power save function, the method including the step of providing dynamic access module 1406 in a plurality of data collection devices 100, and introducing (e.g., by powering up or by physical movement) a new device 100 into the system 1000 at a certain position such that the new device 100 is in connection range of both of first and second device nodes 100 of the system 1000, and wherein the first and second device nodes 100 are not in connection range of one another, wherein the second node is connected to the local server 240, so that a network connection is established between the first node and the server 240 by introduction of the new device at the certain position.

The invention in another aspect is a method for repairing a network connection in a patient care center data collection system having an access point 210 wireline connected to and being part of wireline network 200, the wireline network including a wireline bus 215 and a local server 240, and where the access point can buffer data packets destined for devices requesting a power save function, the method including the step of providing dynamic access module 1406 in a plurality of data collection devices 100, and introducing (e.g., by powering up or by physical movement) a new device 100 into the system 1000 at a certain position such that the new device 100 is in connection range of both of first and second device nodes 100 of the system 1000, and wherein the first and second device nodes 100 are not in connection range of one another, wherein the second node is connected to the local server 240, so that a network connection is established between the first node and the server 240 by introduction of the new device at the certain position.

It is seen that the invention can significantly improve data collection procedures at facilities incorporating data collection system. Network down times can be reduced as the invention enables network failures to be quickly addressed by introducing one or more devices 100 constructed according to the invention into data collection systems at e.g., retail stores, shipping warehouses, and patient care centers, to repair network connections where network connection is lost due to power loss node failures, congestion node failures and other node failures. In that devices 100 can be portable and capable of wireless communication, network connections can be repaired rapidly without installation of any wireline infrastructure. The likelihood of repairing a network connection is increased as additional devices 100 are added to systems. In addition to aiding in repairs to legacy networks, the invention enables new networks to be rapidly deployed. For example, the invention enables a fleet of devices 100 needed on a temporary basis (e.g., as in an inventory application at a retail store) to be quickly connected to a wireline network 200 to gain access to server 240 and 410 without altering or servicing of the existing wireline network 200.

Figure 5A:
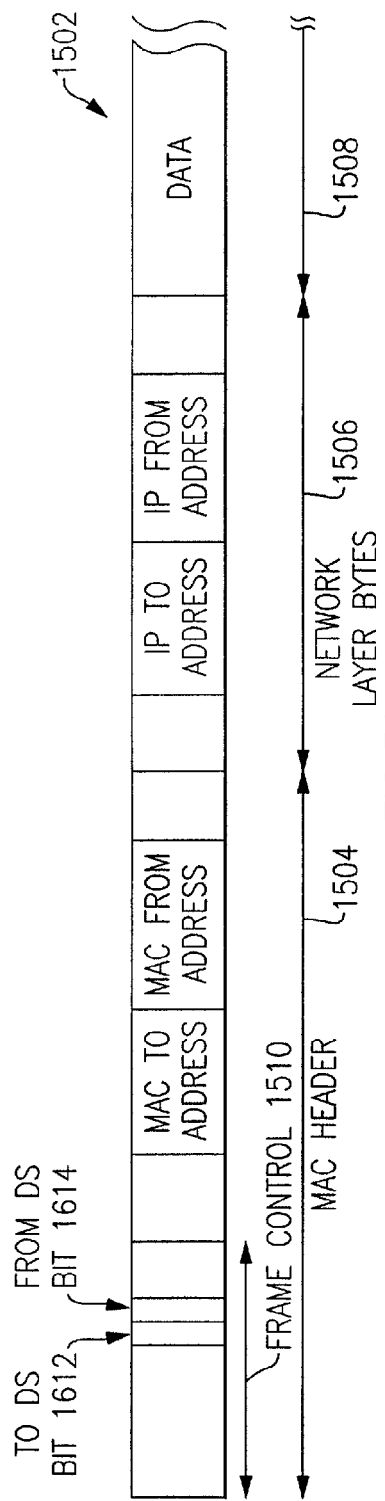
FIGS. 5a and 5b are diagrams illustrating construction of a data packet which may be transmitted and received by a data collection device according to the invention.

The invention is further illustrated with reference to the data packet diagrams of FIGS. 5*a*-5*b*, 6*a*-6*d*. The packet diagrams of FIGS. 5*a*-5*b*, 6*a*-6*d* illustrate a packet stripping and repackaging function which may be carried out by device 100 in accordance with a switching component of dynamic access module 1406. In general, a data packet received and transmitted by device 100-1, where incorporated into an IEEE 802.11 wireless communication system can include the format as shown in FIG. 5*a*. The packet 1502 includes a Media Access Control (MAC) header 1504 that includes frame control field 1510. The packet 1502 also includes network layer bytes 1506 and (payload) data bytes 1508. The packet 1502 can be transmitted in accordance with the TCP/IP suite of protocols. The frame control bytes 1510 include (ToDS) bit 1612 and (FromDS) bit 1614.

Figure 5B:
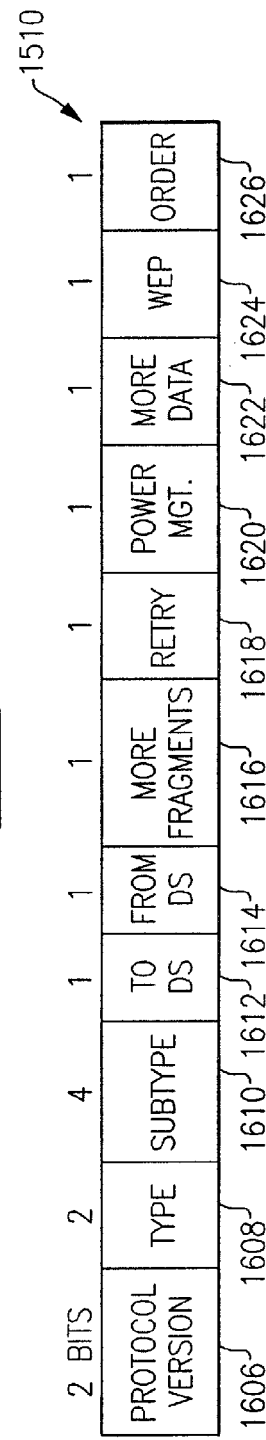

A structure of a control field 1510 of a data packet in accordance with the IEEE 802.11 Standard is described with further reference to the diagram of FIG. 5*b*. Bits 1606 indicate the current version of the 802.11 protocol used, bits 1608, 1610 indicate the function of the current frame (i.e., control, data and management), bits 1612, 1614 as are explained more fully herein below, indicate the path of the frame (i.e., from access point, to access point, or ad hoc communication), bit 1616 indicates whether additional fragments of a current frame will follow, bit 1618 indicates whether the present frame is being retransmitted, bit 1620 indicates whether a sending device is in an active mode or a power save mode as described earlier herein, bit 1622 indicates whether an access point is sending additional frames, bit 1624 indicates whether the present frame is WEP encrypted while bit 1626 indicates whether it is necessary to process a received frame in a particularized order. The operation of access point 210 in reference to its examination of power bit 1620, and encryption bit 1624 has been described herein above.

For data packet transmission from an access point 210, to a data collection device 100-1, the bits 1612, 1614 are encoded as the value 01. For data packet transmissions to access point 210 from data collection device 100-1, the bits 1612, 1614 are encoded as 10. For peer to peer data packet transmissions, the control bits 1612, 1614 are encoded as the value 00.

Figure 6A:
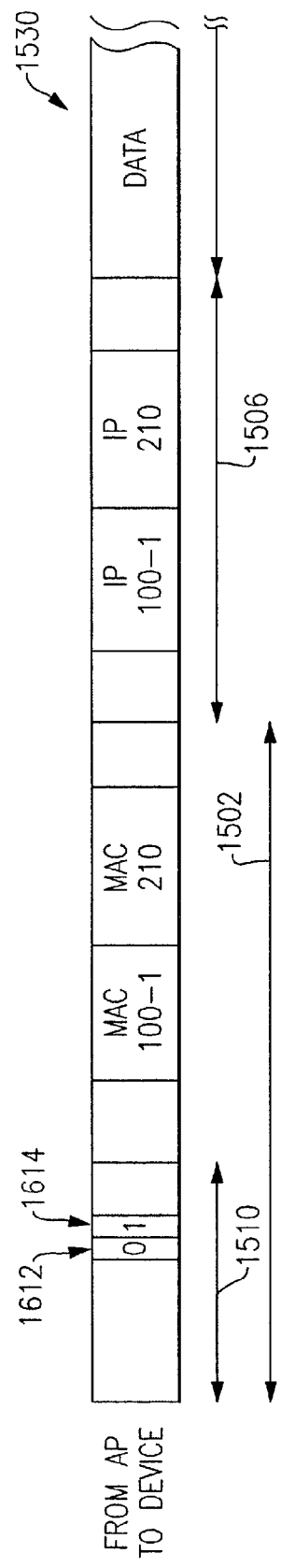

Referring to FIG. 6a, the data packet 1530 is received by the data collection device 100-1, from the access point 210, when it 100-1 is operating in an infrastructure mode. Referring to FIG. 6b, the data packet 1540 is transmitted from data collection device 100-1, to the access point 210, when it 100-1 is operating in an infrastructure mode. The DS bits 1612, 1614 are encoded as value equal to 01 to indicate that the packet is being sent from the data collection device 100-1 to the access point 210.

Referring to FIG. 6c, the data packet 1550 is transmitted from the data collection device 100-1 to a peer device 100-2. The DS bits 1612, 1614 are encoded as a value equal to 00 to indicate that the packet is being transmitted from a data collection device 100-1 to a data collection device 100-2, via the IBSS.

Referring to FIG. 6d, the data packet 1560 is transmitted from a peer data collection device 100-2 to the data collection device 100-1. The DS bits 1612, 1614 are encoded as a value equal to 00 to indicate that the transmission of the data packet 1560 is from a data collection device 100-1 to a data collection device 100-2, via the IBSS.

When performing network switching in accordance with switching module 1472, data collection device 100 may receive a data packet from peer data collection device in the form of packet 1560 and repackage the payload data of the packet in the form of packet 1540 in order to route the payload data to access point 210. Also, when performing network switching, data collection device 100, 100-1 may receive a data packet from an access point in the form of packet 1530 and repackage the payload data of the packet into the form of packet 1550 when routing that payload data to peer device 100, 100-2. In an 802.11 radio communication system "media disconnect" and "media connect" notification messages are passed to the network (IP) layer when there is a switching of a network. The IP layer delays processing of such notification messages to protect layer 3106 from spurious media connects and disconnects. In order to reduce the processing delay resulting from network switching, the dynamic access module 1460 can be authored so that media disconnect and media disconnect notification messages to the IP layer are suppressed. In addition, switching delays can be further reduced by avoiding resetting of firmware of radio transceiver 5712 when switching, and by storing the state of the presently associated network (infrastructure or ad hoc) prior to switching so that device 100 does not have to re-execute a network association protocol each time device 100 switches networks. Such switching time reduction methods are discussed in U.S. Patent Application Publication No. US2004/0218580, published Nov. 4, 2004 and entitled, "Method To Enable Simultaneous Connections To Multiple Wireless Networks Using A Single Radio."

In embodiments described thus far, switching component 1472 is incorporated in a device 100 having a single processor IC chip 548 and a single radio transceiver 5712, also referred to as a network interface card (NIC) capable of switching between infrastructure and ad hoc modes (i.e., a single 802.11 radio transceiver). A real time operating system can be loaded into processor IC chip 540 and, in accordance with switching component; the processor IC chip 548 can be configured so that processing time is divided between managing communication in infrastructure mode and managing communication in an ad hoc mode.

In a variation of the invention, device 100 can incorporate a second radio transceiver of the same protocol Standard as a first radio transceiver. The second radio transceiver may be a second radio transceiver 5712. In accordance with the IEEE 802.11 Standard, second radio transceiver 5712 is capable of switching between infrastructure and ad hoc communication modes. One of the radio transceivers can be dedicated for conducting infrastructure communications and the second radio transceiver can be dedicated for conducting ad hoc data communications. In such an embodiment, device 100 in accordance with switching component 1472, need not switch a communication mode of an individual NIC, but rather, in accordance with switching component 1472, need only strip received data packets, buffer payload data and repackage the payload data into a suitable form for transmission by the device's second NIC.

Figure 1C:
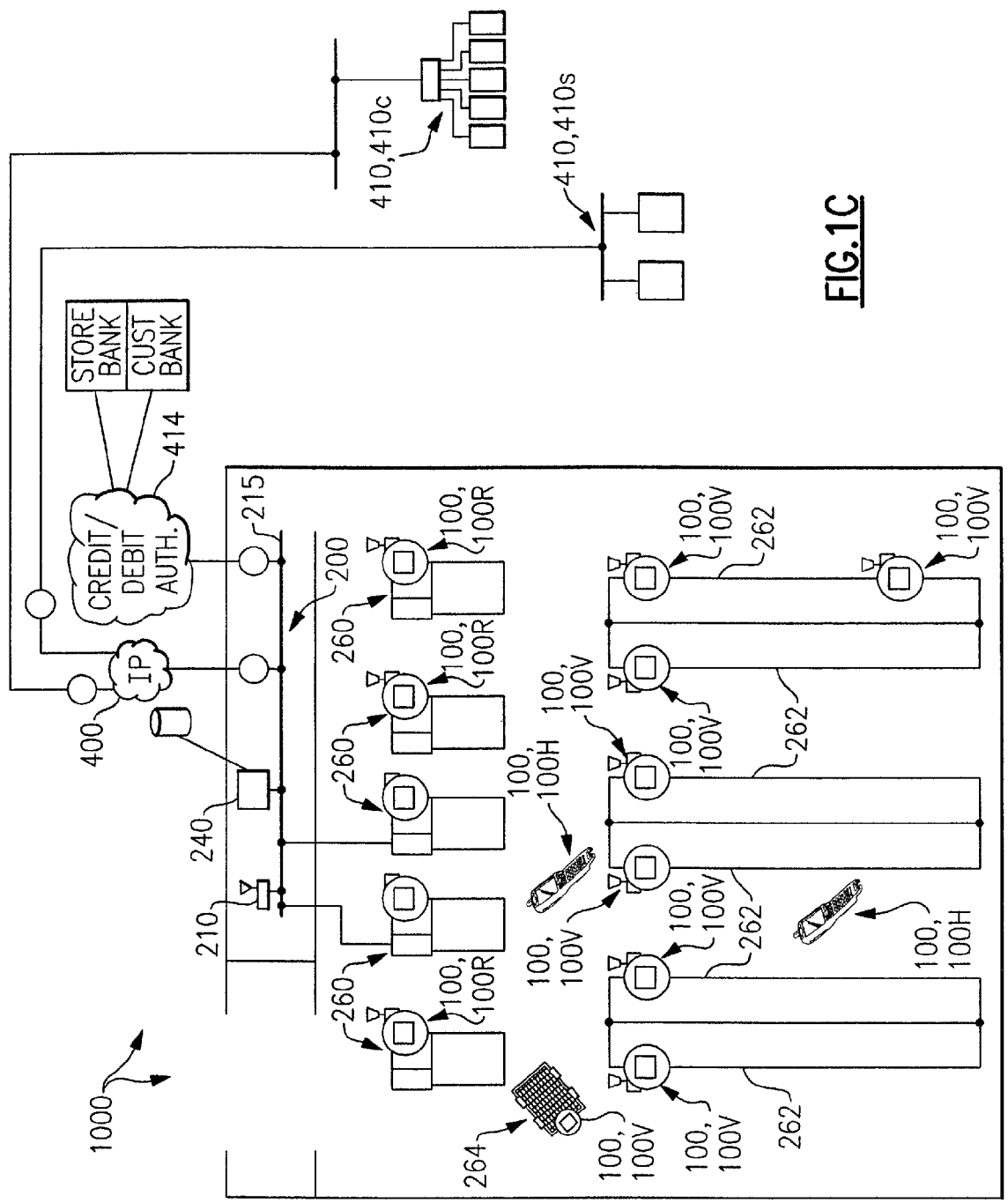
FIG. 1c illustrates a data collection system according to the invention including a retail store.
Figure 1D:
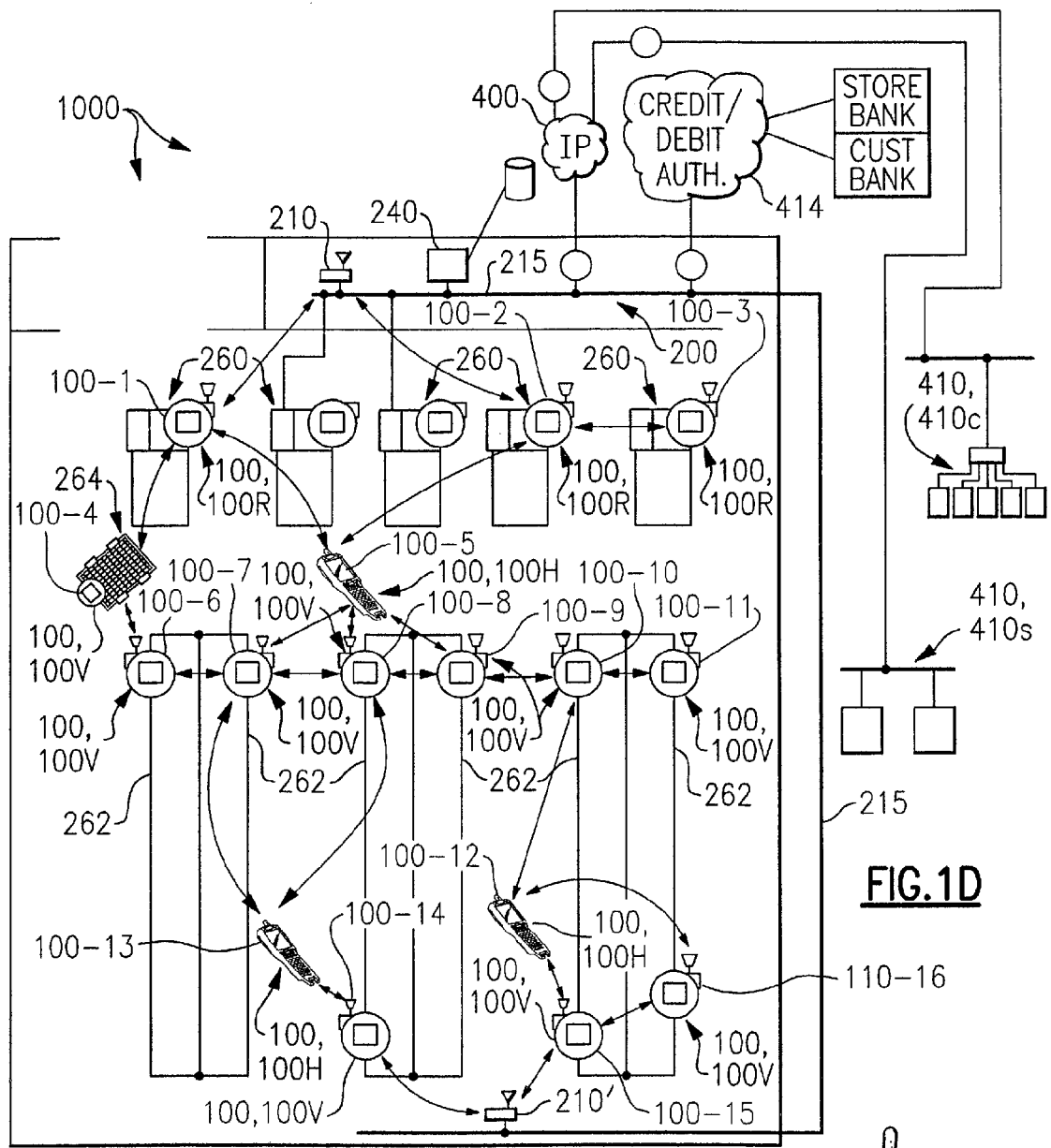
FIG. 1d is a system diagram illustrating a specific implementation of a system according to the invention.
Figure 1E:
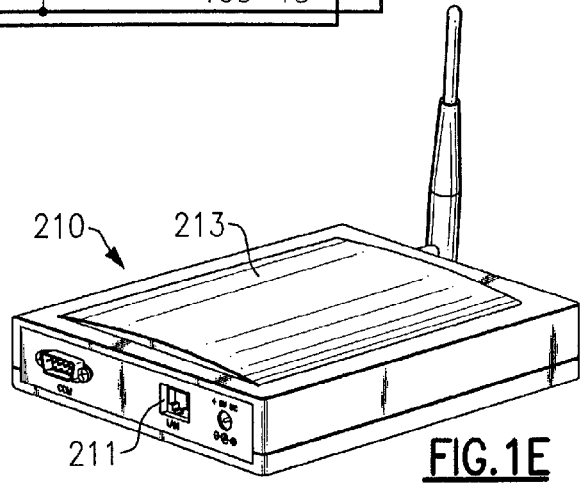
FIG. 1e is a rear perspective view of an access point of a system according to the invention showing a port for adapting the access point for connection to a wireline bus.

Further aspects of the invention are described with reference to FIG. 1c showing a data collection system 1000 partially integrated in a retail store. System 1000 as shown in FIG. 1c includes a plurality of hand held data collection devices 100H and a plurality of mounted data collection devices. The mounted data collection devices 100 include retail transaction aiding credit/debit card reading devices 100R located at front end cashier stations 260 and price verifiers 100V deployed throughout the store to facilitate price lookups by customers. Data collection devices 100H can have the form described further with reference to FIGS. 8a and 8b, and data collection devices 100R, 100V can have the form described with further reference to FIGS. 9a, 9b and 9c. Several prices verifiers 100V can be mounted on or proximate to store shelves 262 (i.e., on posts) while other mobile price verifiers 100P can be mounted on shopping carts 264. The mounted portable data collection devices 100R, 100V can be replaceably mounted; that is, they can be demounted from their current mounting position and remounted in another mounting position within the retail store or other facility. The plurality of hand held portable devices 100H can be carried by agents of a store or by agents of an inventory-conducting entity. All of the devices 100 in the system described can be controlled to make repeated data transmissions to local store server 240 or to one of remote servers 410, which in certain embodiments may be server centers including a plurality of servers. For example, debit/credit card reading data collection devices 100R may make repeated requests to send transaction data including account number data to credit/debit authorizing network 414. Credit/debit card reading devices 100R and price verifiers 100V may also send customer ID information to customer data base server 410C to request profiling information respecting a particular customer. Hand held portable data collection devices 100H may make repeated requests for price information from a price lookup table (PLU) stored in store server 240. Hand held portable data collection devices 100H may also make item ordering requests to retailer supplier server 410S. Price verifiers 100V may make repeated requests to store server 240 for price information respecting items that are subject to bar code or RFID tag reading by a customer. Item ordering data may also be submitted from a price verifier 100V to supplier server 410S along with credit/debit card amount information as read by an optional card reader 1348 of price verifier 100V. It will be seen that the need for data collection devices 100 to remain connected to a store server 240 and remote servers, e.g., servers 240, 410 is substantial. Each of the data collection devices 100H, 100R, 100V is a data collection device 100 as described herein which can incorporate the components of FIG. 1b.

According to the invention, several additional devices that are configured to include a dynamic access module 1406 can be added to system 1000 with no modification of the components of a legacy local infrastructure network 200. There is no need, for example, to boost the radio transmission range of access point 210, since the communication range of a particular device 100 can be increased by disposing devices 100 intermediate of the device and the access point 210. Legacy access points 210 may be operated continuously in infrastructure mode so that access point 210 provides continuous access to the wireline network to which it is connected. With the present invention devices 100 can be deployed in system 1000 without disrupting the continuous operation of access point 210 in infrastructure mode.

New devices 100H, 100R, 100V that are added to system 1000 have connectivity to servers 240, 410 even where out of range of access point 210 provided that devices 100 of the system define a self organized network with an available hopping sequence communication path between the added device 100 and the access point 210 of the legacy infrastructure network.

In a further aspect, dynamic access communication protocol module 1406 may incorporate a packet content discriminator module 1480. Packet content discriminator module 1480 can examine the content of a data packet buffered for transmission by device 100. Packet content discriminator module 1480 may also discriminate content of a data packet by receipt of a content identifier from control circuit 552, without examination of packet content wherein control circuit 552 has prior knowledge of data content. For example, when control circuit 552 executes a data collection routine to transmit decoded bar code data, it is known that the content of the packet is bar code data without examination of a data packet.

Referring to the table of FIG. 13 correlating data packet content with self routing algorithm modules 1467, 1468, 1469, data collection device 100 may activate one out a plurality of self-routing algorithm modules 1467, 1468, 1469 based upon the particular type of data being transmitted by device 100 over a radio transceiver, e.g., transceiver 2712. In accordance with dynamic access module 1406 in another aspect, dynamic access module 1406 may include a routing algorithm selection component 1490 which enables data collection device 100 to activate a particular one routing algorithm module 1467, 1468, 1469 for establishing a hop sequence based on the content of the data packet being transmitted. Data collection device 100 may utilize the output from packet content discriminator 1480 in order to activate a select one of routing algorithms modules 1467, 1468, 1469. Referring to the table of FIG. 13, first and second embodiments are shown and described.

Referring to embodiment 1, data collection device 100 discriminates whether the data packet being transmitted is streaming video data, still image data, decoded bar code data, decoded RFID data, credit card information data or VOIP data. If device 100 in accordance with packet content discriminator module 1480 determines that the data packet to be transmitted contains streaming video data, latency based routing algorithm module 1467 is activated. If device 100 in accordance with packet content discriminator module 1480 determines that the data packet to be transmitted is still image data (i.e., a frame of image data) data collection device 100 activates power aware routing algorithm module 1468. If device 100 in accordance with packet content discriminator module 1480 determines that the data packet to be transmitted contains decoded bar code data, device 100 activates bit error rate based routing algorithm module 1469. If device 100 in accordance with packet content discriminator module 1480 determines that the data packet to be transmitted contains decoded RFID data, device 100 activates power aware routing algorithm module 1468. If device 100 in accordance with packet content discriminator module 1480 determines that the data packet to be transmitted contains credit card account information, device 100 activates bit error rate routing algorithm module 1469. If device 100 in accordance with packet content discriminator module 1480 determines that the data packet to be transmitted contains VOIP data, device 100 activates latency routing algorithm module 1467.

Referring to embodiment 2, data collection device 100 discriminates whether the data packet being transmitted is streaming video data, still image data, decoded bar code data, decoded RFID data, credit card information data or VOIP data. If device 100 in accordance with packet content discriminator module 1480 determines that the data packet to be transmitted contains streaming video data, latency based routing algorithm module 1467 is activated. If device 100 in accordance with packet content discriminator module 1480 determines that the data packet to be transmitted is still image data (i.e., a frame of image data) data collection device 100 activates bit error rate routing algorithm module 1468. If device 100 in accordance with packet content discriminator module 1480 determines that the data packet to be transmitted contains decoded bar code data, device 100 activates power aware based routing algorithm module 1468. If device 100 in accordance with packet content discriminator module 1480 determines that the data packet to be transmitted contains decoded RFID data, device 100 activates power aware routing algorithm module 1468. If device 100 in accordance with packet content discriminator module 1480 determines that the data packet to be transmitted contains credit card account information, device 100 activates power aware routing algorithm module 1468. If device 100 in accordance with packet content discriminator module 1480 determines that the data packet to be transmitted contains VOIP data, device 100 activates latency routing algorithm module 1467.

Packet content discriminator component 1490 which can examine payload data can be regarded as being inserted into application layer 3116 (FIG. 3b), while self-routing component 1466 can be regarded as being inserted in network layer 3106 (FIG. 3b). Accordingly, routing algorithm selection component 1490 can include providing commands in network layer 3106 based on processing of data within application layer 3116.

With reference to FIG. 1a, devices 100 may operate with ESS (Extended Service Set) if network 200 has more than one access point, e.g., access point 210'. Operating in accordance with ESS, system 1000 may pass communication between device 100-1 and access point 210 to device 100, 100-1 and another access point 210' if device 100, 100-1 passes out of range from access point 210' and into communication range of access point 210'.

An electrical block diagram of a data collection device 100, according to the invention is shown in FIG. 1b. Reader 100 includes a solid state image sensor array 182A, incorporated on an image sensor integrated circuit chip 1082A shown in FIG. 1d as a CMOS image sensor integrated circuit (IC) chip. In an important aspect, as will be described herein, image sensor array 182A includes a plurality of pixels and wavelength sensitive color filter elements associated with a color sensitive subset of the pixels, wherein the remaining pixels external to the color sensitive subset of pixels are devoid of associated wavelength selective filter elements. Because image sensor array 182A includes both monochrome pixels and color sensitive pixels, image sensor array 182A may be termed a hybrid monochrome and color image sensor array. Image sensor array 182A incorporated in device 100 can take on a variety of forms. For example, as described in connection with FIGS. 11a-11b, an image sensor array or device 100 can be provided by incorporating an IT4XXX/IT5XXX imaging module of the type available from Hand Held Products, Inc., Skaneateles Falls, N.Y. into device 100. Device 100 further includes a processor IC chip 548 and a control circuit 552. Control circuit 552 in the embodiment of FIG. 1b is shown as being provided by a central processing unit (CPU) of processor IC chip 548. In other embodiments, control circuit 552 may be provided by e.g., a programmable logic function execution device such as a field programmable gate array (FPGA) or an application specific integrated circuit (ASIC). Imaging lens 212 focuses images onto an active surface of image sensor array 182A together with image sensor array 182A forms an imaging assembly 200. Control circuit 552 executes picture taking and indicia decoding algorithms in accordance with instructions stored in program memory EPROM 562 which together with RAM 560 and Flash memory 564 forms a reader memory 566. Reader memory 566 is in communication with processor IC chip 548 via system bus 570. Main processor IC chip 548 may be a multifunctional IC chip such as an XSCALE PXA25x processor IC chip including central processing unit (CPU) 552 or an OMAP processor IC chip such as an OMAP 1710 processor IC chip with core ARM 926 of the type available from TEXAS INSTRUMENTS. Device 100 further includes a field programmable gate array (FPGA) 580. Operating under the control of control circuit 552, FPGA 580 receives digital image data from image sensor IC chip 1082A and transfers that image data into RAM 560 so that the image data can be further processed (e.g., by the decoding of a bar code symbol). Processor IC chip 548 can include an integrated frame grabber. For example, processor IC chip 548 can be an XSCALE PXA27X processor IC chip with "Quick Capture Camera Interface" available from INTEL. Where processor IC chip 548 includes an integrated frame grabber, the integrated frame grabber may provide the frame acquisition functionality of FPGA 580. By incorporation of appropriate software, such as the PVPLATFORM wireless multimedia software platform available from PACKETVIDEO, device 100 can be configured to transmit streaming video data packets over radio frequency communication interface block 5711, as is described further herein below. Device 100 further includes an illumination assembly 104 and a manual trigger 216. Image sensor IC chip 1082A in the embodiment of FIG. 1b includes an on-chip control/timing circuit 1092, an on-chip gain circuit 1084, an on-chip analog-to-digital converter 1086 and an on-chip line driver 1090. An image sensor array which is incorporated into device 100 may take on a variety of forms. Variations of image sensor arrays which may be incorporated in device 100 are described in detail in Provisional Patent Application Nos. 60/687,606, filed Jun. 3, 2005, 60/690,268, filed Jun. 14, 2005, 60/692,890, filed Jun. 22, 2005, and 60/694,371, filed Jun. 27, 2005, all of which are entitled Digital Picture Taking Optical Reader Having Hybrid Monochrome And Color Image Sensor, and all of which are incorporated herein by reference. In the above provisional patent applications, data collection devices having numerous types of image sensor arrays; e.g., hybrid monochrome and color (uniform and non-uniform pixel size), monochrome, color, hybrid monochrome and light polarizing) together with associated processing methods are shown and described. All device specific components and processing features described in the above referenced provisional applications can be incorporated into device 100. All system related components and processing features described in the above referenced provisional applications can be incorporated into system 1000. Data collection device 100 may be configured to process image data to discriminate between decodable symbols and handwritten characters as is described in U.S. patent application Ser. No. 10/958,779 filed Oct. 5, 2004 and incorporated herein by reference. Also incorporated herein by reference are U.S. Provisional Patent Application Nos. 60/712,037 filed Aug. 26, 2005 and 60/725,001 filed Oct. 7, 2005. Device 100 can incorporate an image sensor IC chip (modified or off-the-shelf, color or monochrome) provided by e.g., an MT9V022 or MT9M413 image sensor IC chip available from Micron, Inc. or a KAC-0311 image sensor IC chip by Kodak, Inc.

In a further aspect, device 100 includes a radio frequency (RF) communication interface block 5711. Radio frequency communication interface block 5711 may include one or more radio transceivers. Referring to the schematic diagram of FIG. 1b, radio frequency communication interface block 5711 may include one or more of an 802.11 radio transceiver 5712, a Bluetooth radio transceiver 5714, a cellular radio transceiver 5716, or a WIMAX (802.16) radio transceiver 5718. Radio frequency communication interface 5711 facilitates wireless communication of data between device 100 and a spaced apart device 150 of the referenced applications. I/O communication interface 572 includes one or more serial or parallel hard-wired communication interfaces facilitating communication with a spaced apart device 150 as will be described further in connection with FIG. 10. I/O communication interface 572 may include one or more of an Ethernet communication interface, a universal serial bus (USB) interface, or an RS-232 communication interface. Data collection device 100 may further include a keyboard 508 for entering data, a pointer mover 512 for moving a pointer of a graphical user interface (GUI) and a trigger 216 for initiating bar code reading and/or picture taking. Data collection device 100 may also include a display 504, such as a monochrome or color LED display and a touch screen 504T overlaid over display 504. Display 504 may be coupled to display controller for displaying color image data. All of the components of FIG. 1b can be encapsulated and supported by a portable hand held housing 101, e.g., as shown in FIGS. 8a and 8b or a replaceably mountable portable housing 102 as shown in FIGS. 8a-9a. The components shown in FIG. 1b can be powered by a multi-voltage power system 1095 that is coupled redundantly to multiple power sources, including serial power source (USB) 1097, transformer based AC/DC power supply 1098 that is adapted to receive AC wall outlet power and rechargeable battery 1099. Power system 1096 can provide power to circuit boards 1077 as shown in FIG. 8b.

In another aspect, device 100 includes an RFID reader unit 1250. RFID reader unit 1250 includes an RF oscillation and receiver circuit 1252 and a data decode processing circuit 1254. RFID reader unit 1250 may be configured to read RF encoded data from a passive RFID tag, such as tag 1260, which may be disposed on article 1202. Where RFID reader unit 1250 is configured to read RF encoded data from a passive RFID tag 1260, RF oscillation and receiver circuit 1252 transmits a carrier signal from antenna 1255 to passive tag 1260. Passive RFID tag 1260 converts the carrier energy to voltage form and a transponder 1266 of tag 1260 is actuated to transmit a radio signal representing the encoded tag data. RF oscillator and receiver circuit 1252, in turn, receives the radio signal from the tag and converts the data into a processable digital format. Data decode processing circuit 1254, typically including a low cost microcontroller IC chip, decodes the received radio signal information received by RF oscillator and receiver circuit 1252 to decode the encoded identification data originally encoded into RFID tag 1260.

Figure 12A:
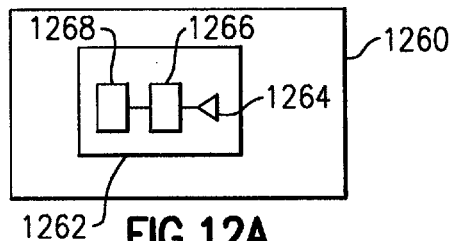
FIGS. 12a-12c illustrate exemplary structures carrying RFID tags which may be read by a data collection device according to the invention.
Figure 12B:
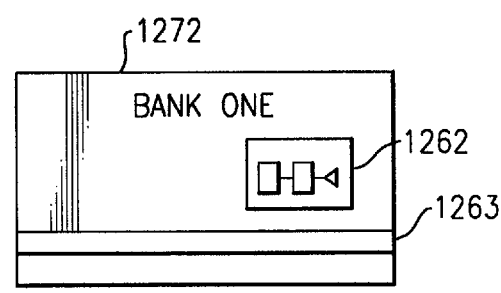
Figure 12C:
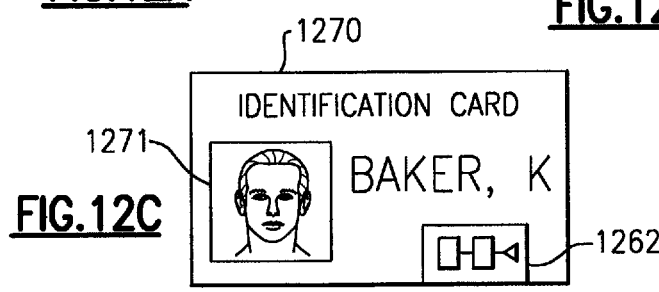

An expanded view of RFID label 1260 is shown in FIG. 12a. RFID label 1260 includes a tag 1262 comprising an antenna 1264, a transponder 1266, and storage circuit 1268 for storing encoded identification data. Label 1260 can be affixed to articles such as articles of parcel or products held in retail store. Data from storage circuit 1268 is read from tag 1262 when tag 1262 is activated by RFID reader unit 1255. Further, reader unit 1250 may write data to tag 1262. Data written to tag 1262 by reader module 1250 may be, e.g., new identification data. Tag 1260 may be incorporated in physical structures other article labels. As shown in FIG. 12c, tag 1262 may be incorporated on an identification card 1270, such as a driver license or an employee identification card. Identification card 1270 may carry a photograph 1271 of an employee. One specific type of employee identification card into which tag may be incorporated is a security badge. Tag 1262 may also be incorporated into a financial transaction card 1272 having a mag stripe 1273 as shown in FIG. 12b, such as a credit card, a debit card, or an electronic benefits card. Card 1272 can also carry magnetic stripe 1263.

RFID reader unit 1250 may operate in a selective activation mode or in a continuous read operating mode. In a selective activation mode, RFID reader unit 1250 broadcasts radio signals in an attempt to activate a tag or tags in its vicinity in response to an RFID trigger signal being received. In a continuous read mode, RFID reader unit 1250 continuously broadcasts radio signals in an attempt to actuate a tag or tags in proximity with unit automatically, without module 1250 receiving a trigger signal. In a selective activation mode, RFID reader unit 1250 selectively broadcasts radio signals in an attempt to activate a tag or tags in its vicinity selectively and automatically in response to a receipt by control circuit 1010 of an RFID trigger signal. Device 100 may be configured so that control circuit 552 receives a trigger signal under numerous conditions, such as: (1) an RFID trigger button such as button 1050 is actuated; (2) an RFID trigger instruction is received from a spaced apart device such as remote processor 1850, or local host processor 1350; and (3) control circuit 552 determines that a predetermined condition has been satisfied.

Still further, device 100 may include a card reader unit 1350 such as credit and debit card reader unit. Card reader unit 1350 includes a signal detection circuit 1352 and a data decode circuit 1354. Signal detection circuit 1352 receives an electrical signal from a card and data decode circuit 1354 decodes data encoded in the signal. When data decode circuit 1354 decodes a signal, the decode out information is transmitted to control circuit 1010 for further processing. Card reader unit 1350 forms part of a card reader 1348 which, in addition to including card reader unit 1350, includes a portion of housing 102 as shown in the embodiments of FIGS. 8a and 8b. Card reader 1348 includes card receiving slot 1349 defined by housing 105. Card reader unit 1350 is configured to read more than one type of card. Device 100, with use of card reader unit 1350, may read e.g., credit cards, customer loyalty cards, electronic benefits cards and identification cards such as employee identification cards and driver license cards. Card reader unit 1350 can be selected to be of a type that reads card information encoded in more than one data format. Where card reader unit 1350 is a Panasonic ZU-9A36CF4 Integrated Smart Reader, card reader unit 1350 reads any one of magnetic stripe data, smart card or Integrated circuit card (IC card) data, and RF transmitted data. Where card reader unit 1350 reads RF transmitted identification data via RFID reading capability thereof, card reader 1348 may read RF transmitted identification data from a card when a card is inserted into slot, or else card reader unit 1350 may read RF transmitted identification data from a card or another object (e.g., an RFID "key fob") when the card or object is merely brought into proximity with card reader 1348 without being inserted into slot 1349. Accordingly, where card reader unit 1350 is a Panasonic ZU-9A36CF4 Integrated Smart Reader, device 100 has dual RFID reader modules; namely, RFID reader module 1250 and the RFID reader module incorporated in card reader unit 1350.

In another aspect data collection device 100 as shown in FIG. 1b includes Voice Over IP (VOIP) processing unit 1450. Voice processing unit 1450 includes VOIP dual coder/decoder (CODEC) 1444, microphone 1446, and speaker 1448. VOIP CODEC 1444 receives an analog voice output signal from microphone 1446 and processes the output signal to produce a digital output. VOIP CODEC 1444 further processes digital voice data into analog form for output to speaker 1448. Voice data can be further processed by appropriately configured digital signal processing (DSP) circuitry of processor IC chip 548. In one example, VOIP dual CODEC 1444 is provided by a TLV320AIC22C DUAL CODEC, available from Texas Instruments, and is incorporated in association with a processor IC chip 548 provided by an OMAP series processor with TMS320C55X DSP also available from Texas Instruments.

As indicated herein, the components of device 100 shown and described in FIG. 1b can be incorporated into a variety of different housings. As indicated by the embodiment of FIGS. 8a and 8b, the components of FIG. 1b can be incorporated into a hand held housing 101 as shown in FIGS. 8a and 8b which is shaped to be held in a human hand. Data collection device 100 of FIGS. 8a and 8b is in the form factor of a hand held portable data terminal. Data collection device 100 as shown in FIGS. 8a and 8b includes a keyboard 508 a display 504 having an associated touch screen overlay 504T, a card reader 1348 and an imaging module 360 which includes the components of imaging assembly 200 as described herein; namely image sensor array 182A incorporated on an image sensor IC chip 1082A. Imaging module 360 has an associated imaging axis, $a_i$. As indicated by the side view of FIG. 8b, the components of the block diagram of FIG. 1b may be supported within housing 101 on a plurality of circuit boards 1077. Imaging module 360 may include an image sensor array having color sensitive pixels as described in Provisional Patent Application Nos. 60/687,606, filed Jun. 3, 2005, 60/690,268, filed Jun. 14, 2005, 60/692,890, filed Jun. 22, 2005, and 60/694,371, filed Jun. 27, 2005, all of which are entitled Digital Picture Taking Optical Reader Having Hybrid Monochrome And Color Image Sensor, and all of which are incorporated herein by reference.

Figure 9A:
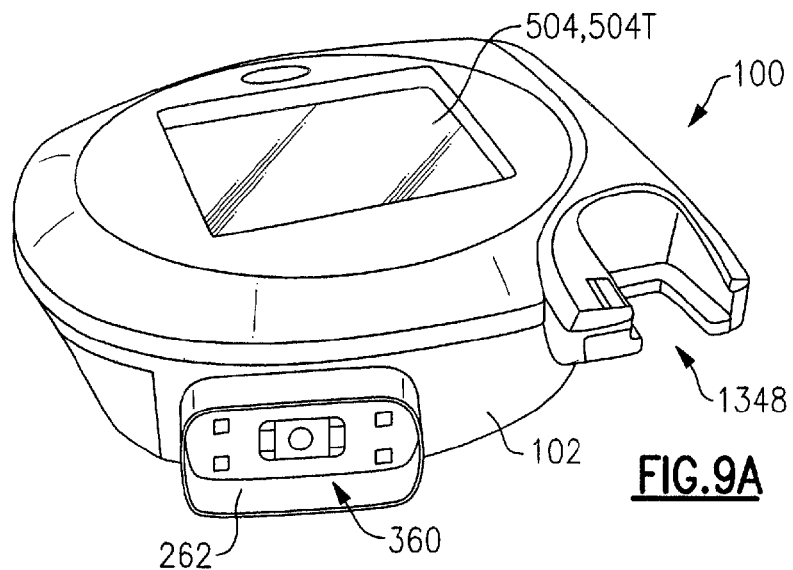
FIGS. 9a-9c illustrate an exemplary portable and remountable housing into which all of the components of FIG. 1b may be integrated, and which may support all of the components of FIG. 1b.
Figure 9B:
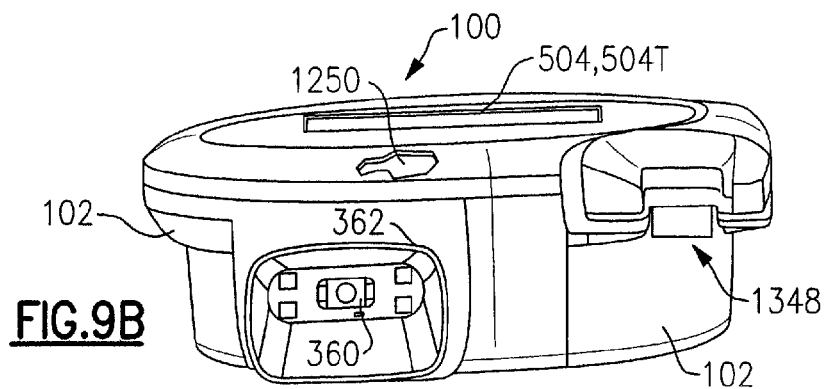
Figure 9C:
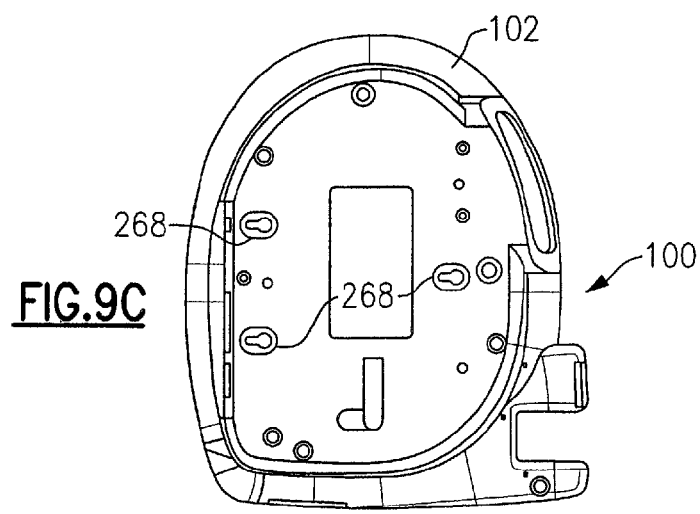

In the embodiment of FIGS. 9a-9c data collection device 100 is in the form of a transaction terminal which may be configured as a retail purchase transaction terminal or as a price verifier. Housing 102 of the transaction terminal shown in FIGS. 9a-9c is configured to be portable so that it can be moved from location to location and is further configured to be replaceably mounted on a fixed structure such as a fixed structure of a cashier station or a fixed structure of the retail store floor (e.g., a shelf, a column 264). Referring to bottom view of FIG. 9c, the housing 102 data collection device 100 has formations 268 facilitating the replaceable mounting of data collection device 100 on a fixed structure. Data collection device 100 includes a display 504 having an associated touch screen 504T, a card reader 1348, and an imaging module 360 having an imaging axis, $a_i$. Referring to further details of data collection device 100, data collection device 100 further includes a luminous shroud 362. When light from illumination block 104 strikes luminous shroud 362, the shroud glows to attract attention to the location of imaging assembly. In certain operating modes as indicated in FIG. 10c, data collection device 100 in accordance with any of FIGS. 8a-9c, displays on display 504 a PIN entry screen prompting a customer to enter PIN information into touch screen 504T. In other operating modes, as indicated in FIG. 10d, data collection device 100 displays on display 504 a signature prompt screen prompting a customer to enter signature information into the device with use of a stylus 505.

Figure 11A:
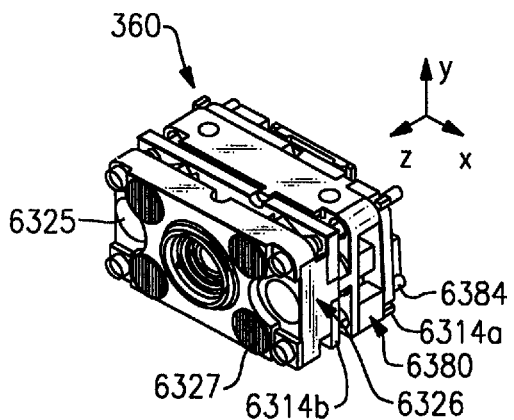
FIGS. 11a-11b illustrate perspective and perspective assembly views of a first exemplary imaging module which may be incorporated into a data collection device according to the invention.
Figure 11B:
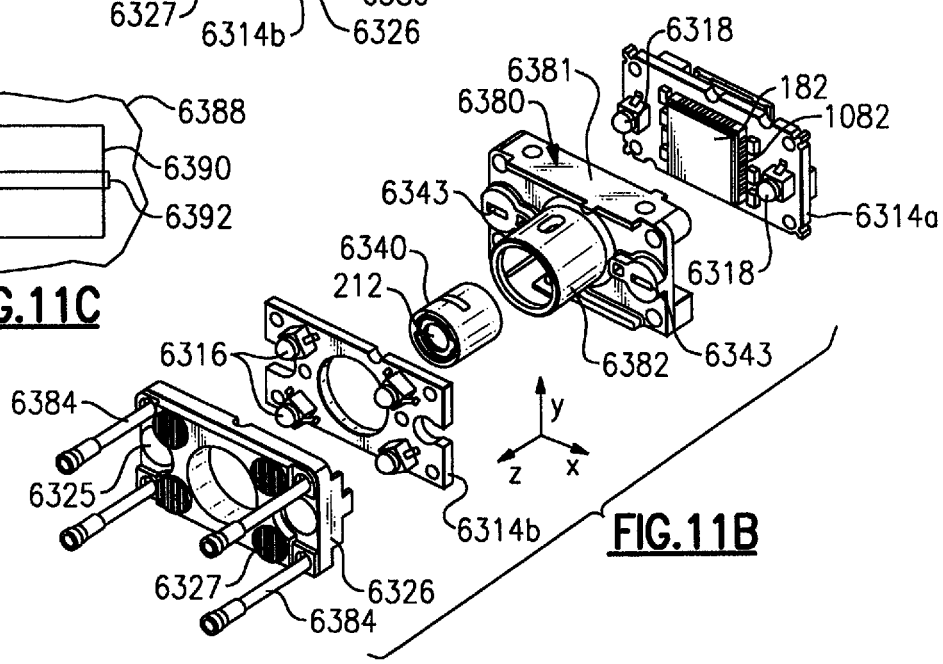
Figure 11C:
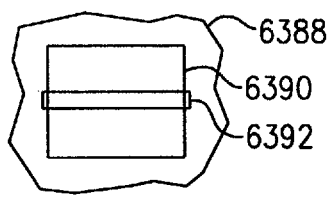
FIG. 11c illustrates exemplary illumination and aiming patterns which may be projected by an imaging module according to the invention.

Referring to FIGS. 11a-11c construction detail of imaging module 360 are shown. Imaging module 360 may be an IT 4XXX imaging module of the type sold by Hand Held Products, Inc. of Skaneateles Falls, N.Y. An IT 4XXXX imaging module may be sold in association with a decode circuit which processes image signals generated by module 360 and decodes the signals to generate decoded out message data, such as decoded out bar code message data from numerous symbologies such as PDF417, MicroPDF417, MaxiCode, Data Matrix, QR Code, Aztec, Aztec Mesa, Code 49, UCC Composite, Snowflake, Dataglyphs, Code 39, Code 128, Codabar, UPC, EAN, Interleaved 2 of 5, RSS, Code 93, Codablock, BC 412, Postnet (US), Planet Code, BPO 4 State, Canadian 4 State, Japanese Post, Kix (Dutch Post) and OCR-A, OCR-B. Imaging module 360 includes a first circuit board 6314A carrying image sensor IC chip 1082 and aiming LEDs 6318 while a second circuit board 6314B carries illumination LEDs 6316. Image sensor array 182 in the embodiment of FIG. 11b can be a two dimensional monochrome image sensor array. The circuit boards are sandwiched about support 6380 which has a retainer 6382. Retainer 6382 receives a lens barrel 6340 which holds imaging lens 212. Conductive support posts 6384 support the structure and provide electrical communication between the circuit boards 6382. An optical plate 6326 is fitted over circuit board 6314B after circuit board 6314B is mounted onto support 6380. Optical plate 6326 carries aiming lenses 6325 which image aiming slits 6343 onto a substrate, s, which may carry a bar code symbol. Optical plate 6326 may also carry diffusers which diffuse light from illumination LEDs 6316. Referring to the view of FIG. 11c, illumination LEDs 6316 in combination with diffusers may project an illumination pattern 6388 substantially corresponding to a field of view 6390 of imaging assembly 200, while the aiming system including aiming LEDs 6318 slits 6343 and aiming lenses 6325 project an aiming pattern 6392 comprising a thin horizontal line.

Figure 10A:
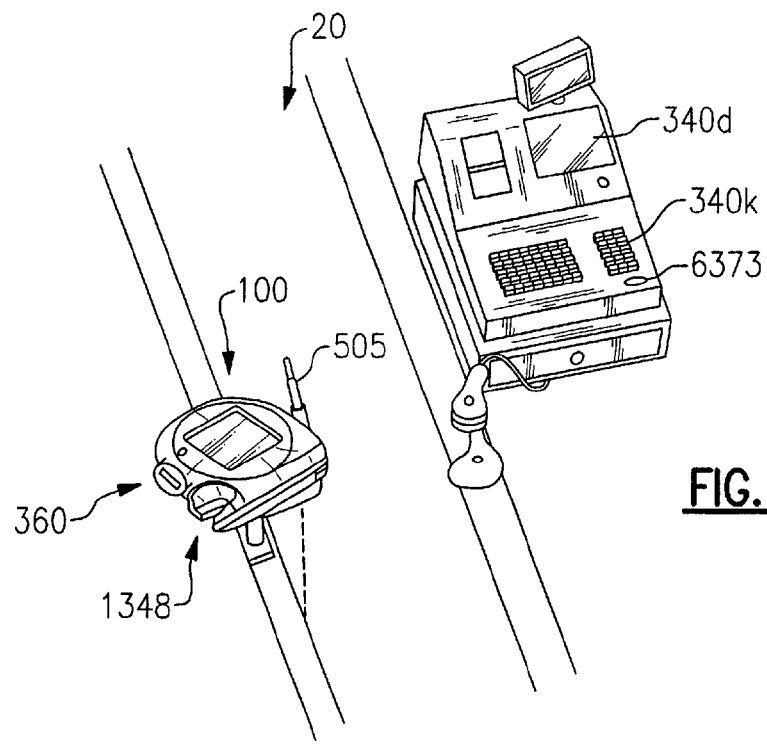
FIG. 10a illustrates a first exemplary deployment of a data collection device according to the invention within a retail store.
Figure 10B:
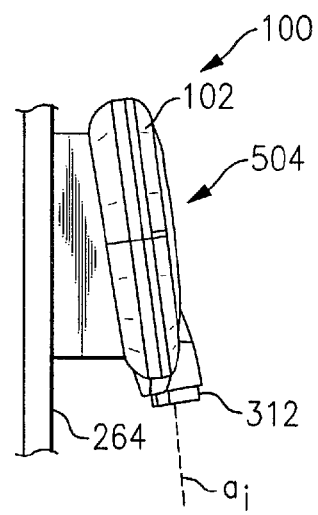
FIG. 10b illustrates a second exemplary deployment of a data collection device according to the invention within a retail store.
Figure 10C:
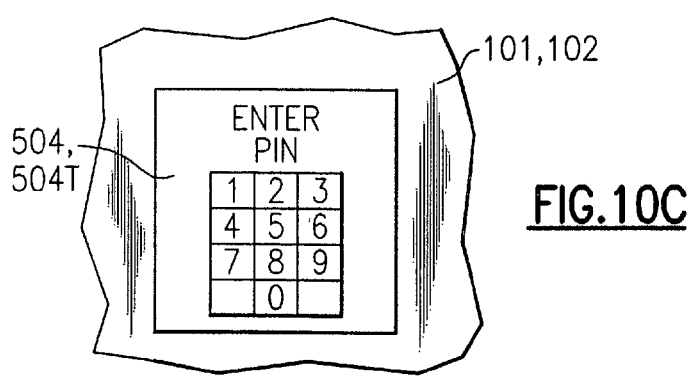
FIGS. 10c and 10d illustrate PIN and signature data entry operational modes of a data collection device according to the invention.
Figure 10D:
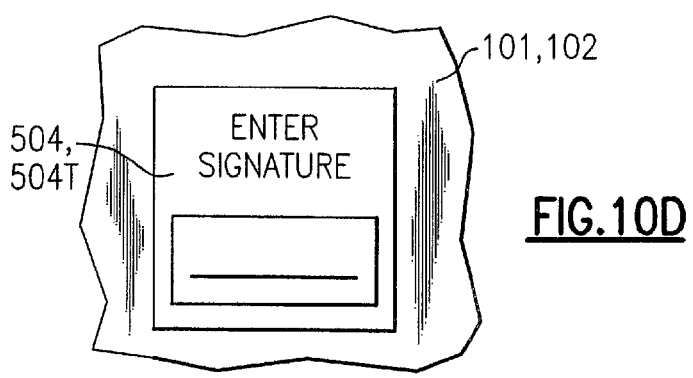

Referring to FIGS. 10a and 10b, various installation configurations for the data collection device of FIGS. 8a-9c are shown. In the view of FIG. 10a, data collection device 100 is installed as a retail purchase transaction terminal at a point of sale cashier station 260. In the setup of FIG. 10a, data collection device 100 is configured as a retail purchase transaction terminal and is utilized to aid and facilitate retail transactions at a point of sale. A customer may enter a credit card or a debit card into card reader 1348 and retail purchase transaction terminal 100R may transmit the credit card information to credit/debit authorization network 414. Referring to the view of FIGS. 1c and 1d, data collection devices 100 configured in accordance with the view of FIG. 10a are designated with the reference numeral 100R.

In the view of FIG. 10b, data collection device 100 is configured as a price verifier to aid customers in checking prices of products located on a store floor 258. Data collection device 100 may be mounted on a shelf 262 as depicted in the view of FIGS. 1c and 1d or on a column 264 as shown in FIG. 10b or other fixed structure of the retail store. Data collection device 100 may decode bar code data from bar codes on store products and send decoded out bar code messages to store server 240 for lookup of price information which is sent back from server 240 to terminal 100 for display on display 504. Referring to the view of FIG. 1c and 1d, data collection devices 100 configured in accordance with the view of FIG. 10b are designated with the numeral 100V.

There is described a data collection device that can incorporate an encoded information reading unit than can operate within a system including an access point that is wireline connected to a server. The encoded information reading unit can include at least one of a bar code reading unit, an RFID tag reading unit and a credit/debit card reading unit. Further incorporated in the data collection device can be dynamic access module. The dynamic access communication module enables the data collection device to participate in a self organized network that supports multi-hop data packet transmissions between data collection devices and which further enables the device to transmit data received from a peer device to the system access point.

A sampling of systems and apparatuses described herein is as follows:

There is provided: (A) A data collection system comprising: first and second portable data collection devices, each data collection device having an encoded information reader unit selected from the group consisting of a bar code decode unit, an RFID reader unit and a credit/debit card reading unit; an access point, said access point being adapted for wireline connection to a local wireline bus and further being configured to examine data packets received thereby to determine whether a transmitting station has requested a power save function, and if said power save function is selected, buffering data packets destined for said requesting transmitting station, wherein said first portable data collection device is configured to operate in an operating mode in which said first portable data collection device receives a data packet data containing payload data from said second portable data collection device and transmits said payload data to said access point.

There is also provided the data collection system of (A), wherein said first portable data collection device includes a hand held bar code reading device and said second portable data collection device includes a credit card reading unit.

There is also provided the data collection system of (A), wherein each of said first and second data collection devices are configured to broadcast routing table data.

In addition, there is provided (B) a portable bar code reading device for incorporation in a data collection system having an access point and at least one peer data collection device, said data collection device comprising: an imaging assembly including a two dimensional solid state image sensor array and a lens focusing an image onto said solid state image sensor array; a radio transceiver for wireless transmission of data packets; a housing, wherein said identification decode unit and said radio transceiver unit are supported within said housing, wherein said housing is one of a hand held housing and a re-mountable housing; and a dynamic access module enabling said data collection device to (i) receive data packets from said access point and route payload data of said data packets to said peer device, and (ii) transmit at least one of routing table data and a route request (RREQ) data packet to said at least one peer data collection device.

There is also provided the data collection device of (B), wherein said data collection device further includes a packet content discriminator.

In addition, there is provided (C) a data collection system comprising: first and second, and third data collection devices, D1, D2, and D3, each data collection device having an identification decode unit selected from the group consisting of a bar code decode unit, an RFID reader unit and a credit/debit card reading unit; and an access point, AP, said access point being wireline connected to a local server and further being configured to broadcast a network identifier, and wherein said access point is further configured to coordinate the wireless sending of Clear to Send (CTS) messages to various devices in communication with said access point in such manner that collisions resulting from two devices attempting to send data packets to said access point at a common time are avoided, wherein said data collection system is configured to support a transmission of a data packet along the hop sequence D1-D2-D3-AP, whereby said first data collection device can be out of range of said access point, yet in communication with said access point.

There is also provided the data collection system of (C), wherein said first data collection device includes a hand held bar code reading device and said second data collection device includes a credit card reading unit, and wherein said third data collection device includes an RFID reading unit.

There is also provided the data collection system of (C), wherein each of said first and second, and third data collection devices are configured to broadcast routing table data enabling peer devices to update their respective routing tables, each routing table including a plurality of network addresses.

In addition, there is provided (D), a data collection device for incorporation in a data collection system having an access point wireline connected to a local server and at least one peer data collection device, said data collection device comprising: an encoded information reading unit selected from the group consisting of a bar code decode unit, an RFID reader unit, and a credit/debit card reader; a radio transceiver; a portable housing, wherein said encoded information reader unit and said radio transceiver unit are supported by said portable housing; a dynamic access circuit incorporated in said data collection device, said dynamic access circuit enabling said data collection device to operate in accordance with a set of linking rules when introduced to said data collection system, said set of linking rules including the rules of: (a) detecting whether said data collection device is in range of said access point; (b) detecting whether said data collection device is in range of said at least one peer device; (c) operating said data collection device in an infrastructure mode if said data collection device is in range of said access point only and not in range of any peer device; (d) operating said data collection device in ad hoc mode if said data collection device is in range of said access point only and not in range of any peer device; and (e) operating said data collection device in dynamic switching mode to dynamically switch between an infrastructure mode and an ad hoc mode if said data collection device determines that said data collection device is in range of both said access point and said at least one peer device.

There is also provided the data collection device of (D), wherein said data collection device is configured to operate in a mode in which said data collection device wirelessly broadcasts a routing table data packet.

There is also provided the data collection device of (D), wherein said data collection device, when operating in said dynamic switching mode switches between said infrastructure and ad hoc modes at fixed time intervals.

In addition, there is provided (E), a portable data collection device for incorporation in a data collection system having an access point wireline connected to a local server and at least one peer data collection device, said data collection device comprising: an encoded information reading unit selected from the group consisting of a bar code decode unit, an RFID tag reader unit, and a credit/debit card reader unit; a radio transceiver; a portable housing, wherein said encoded information reader unit and said radio transceiver unit are supported by said portable housing; wherein said data collection device is configured to operate in a present communication operating mode, the communication operating mode selected from the candidate group consisting of: (a) an infrastructure mode; (b) an ad hoc mode; and (c) a dynamic switching mode in which said data collection device dynamically switches between an infrastructure and ad hoc communication mode; and a dynamic access module incorporated into said data collection device, said dynamic access module having a self healing component enabling said data collection device to (i) monitor data throughput of said device; and (ii) change a present mode of said data collection device from said present communication operating mode to another of said candidate group of communication operating modes in response to said throughput monitoring.

There is also provided the data collection device of (E), wherein said data collection device is configured to operate in a mode in which said data collection device broadcasts a routing table data packet.

There is also provided the data collection device of (E), wherein said data collection device, when operating in said dynamic switching mode switches between said infrastructure and ad hoc modes at fixed time intervals.

In addition, there is provided (F), a data collection device for incorporation in a data collection system having an access point wireline connected to a local server and at least one peer data collection device, said data collection device comprising: an encoded information reading unit selected from the group consisting of a bar code decode unit, an RFID reader unit, and a credit/debit card reader unit; a radio transceiver; a portable housing, wherein said encoded information reader unit and said radio transceiver unit are supported by said portable housing; and a dynamic access circuit incorporated in said data collection device, said dynamic access circuit enabling said data collection device to operate in accordance with a set of linking rules when introduced to said data collection system, said set of linking rules including the rules of: (a) detecting whether said data collection device is in range of said access point; (b) detecting whether said data collection device is in range of said at least one peer device; (c) operating said data collection device in an infrastructure mode if said data collection device is in range of said access point only and not in range of any peer device; (d) operating said data collection device in ad hoc mode if said data collection device is in range of said access point only and not in range of any peer device; and (e) operating said data collection device in dynamic switching mode to dynamically switch between said infrastructure mode and said ad hoc mode if said data collection device determines that said data collection device is in range of both said access point and said at least one peer device, said dynamic access circuit having a self-healing component; wherein said data collection device is configured to operate in a present communication operating mode, the present communication operating mode selected from the candidate group consisting of: (1) said infrastructure mode; (2) said ad hoc mode; and (3) said dynamic switching mode in which said data collection device dynamically switches between an infrastructure and ad hoc communication mode; said self healing component enabling said data collection device to (i) monitor data throughput of said device; and (ii) change a present mode of said data collection device from said present communication operating mode to another of said candidate communication operating modes in response to said throughput monitoring.

There is also provided the data collection device of (F), when said data collection device operates in a mode in which said data collection device sends a power save request, in a data packet to said access point.

In addition, there is provided (G), a data collection device for incorporation in a data collection system having an access point adapted for wireline connection to a wireline bus and at least one peer data collection device, said data collection device comprising: an encoded information reading unit selected from the group consisting of a bar code decode unit, an RFID reader unit, and a credit/debit card reader unit; a radio transceiver; a housing, wherein said identification decode unit and said radio transceiver unit are supported by said housing, wherein said housing is one of a hand held housing and a re-mountable housing; and a dynamic access module enabling said data collection device to (i) determine whether said data collection device is in range said access point, and (ii) determine whether said data collection device is in range of said peer data collection device, said dynamic access module further enabling said data collection device to receive data packets from said access point and route payload data of said data packets to said peer device if said data collection device determines that it is in range of both of said access point and said peer device.

In addition, there is provided (H), a data collection device for incorporation in a data collection system having an access point adapted for wireline connection to a local wireline network and at least one peer data collection device, said data collection device comprising: an encoded information reading unit selected from the group consisting of a bar code decode unit, an RFID reader unit, and a credit/debit card reader unit; a radio transceiver; a housing, wherein said identification decode unit and said radio transceiver unit are supported within said housing, wherein said housing is one of a hand held housing and a re-mountable housing; and a microphone; a Voice Over-Internet Protocol (VOIP) encoder/decoder receiving and processing an analog signal output of said microphone, said data collection device being configured to generate VOIP data packets by process a voice analog signal output from said microphone; a dynamic access module enabling said data collection device to (i) receive data packets from said access point and route payload data of said data packets to said peer device, and (ii) transmit at least one of a routing table data packet and a route request (RREQ) data packet to said at least one peer data collection device.

There is also provided the data collection device of (H), when said data collection device further includes a packet content discriminator.

In addition, there is provided (I), a data collection system comprising: first, second, and third portable data collection devices, D1, D2, and D3, each portable data collection device being separately housed and having an encoded information reader unit selected from the group consisting of a bar code reader unit, an RFID reader unit and a credit/debit card reading unit, said each portable data collection device being capable of operation in (a) infrastructure mode; (b) ad hoc mode and (c) dynamic switching mode in which a data collection device dynamically switches between infrastructure mode and ad hoc mode; an access point, AP, said access point being adapted for wireline connection to a local server, wherein said data collection system is configured to support a transmission of a data packets along the hop sequence D1-D2-D3-AP in such manner that when packet data is transmitted from D1 to D2 in ad hoc mode, said third data collection device, D3 operates in dynamic switching mode.

In addition, there is provided (J), a data collection system comprising: first, second, and third portable data collection devices, D1, D2, and D3, each portable data collection device being separately housed and having an encoded information reader unit selected from the group consisting of a bar code reader unit, an REID reader unit and a credit/debit card reading unit, and each portable data collection device being capable of operation in (a) infrastructure mode; (b) ad hoc mode and (c) dynamic switching mode in which a data collection device dynamically switches between infrastructure mode and ad hoc mode; an access point, AP, said access point being adapted for wireline connection to wireline bus; wherein said data collection system is configured to support a transmission of a data packets along the hop sequence D1-D2-D3-AP in such manner that when packet data is transmitted from said third portable data collection device, D3 to said access point, AP, said first and second data collection devices operate in ad hoc mode.

In addition, there is provided (K), a data collection device for incorporation in a data collection system having an access point wireline connected to a local server and at least one peer data collection device, said data collection device comprising: an imaging assembly including a two dimensional solid state image sensor array and a lens focusing an image onto said solid state image sensor array; a radio transceiver; a portable housing, wherein said encoded information reader unit and said radio transceiver unit are supported by said portable housing; a manual trigger, wherein said data collection device in response to said trigger being actuated, processes image signals generated by said imaging assembly to at least one of (a) decode and transmit a decoded bar code message utilizing said radio transceiver, and (b) transmit said frame of image data utilizing said radio transceiver, a dynamic access circuit incorporated in said data collection device, said dynamic access circuit enabling said data collection device to operate in accordance with a set of linking rules when introduced to said data collection system, said set of linking rules including the rules of: (a) detecting whether said data collection device is in range of said access point; (b) detecting whether said data collection device is in range of said at least one peer device; (c) operating said data collection device in an infrastructure mode if said data collection device is in range of said access point only and not in range of any peer device; (d) operating said data collection device in ad hoc mode if said data collection device is in range of said access point only and not in range of any peer device; and (e) operating said data collection device in dynamic switching mode to dynamically switch between said infrastructure mode and said ad hoc mode if said data collection device determines that said data collection device is in range of both said access point and said at least one peer device, said dynamic access circuit having a self-healing component; wherein said data collection device is configured to operate in a present communication operating mode, the present communication operating mode selected from the candidate group consisting of: (1) said infrastructure mode; (2) said ad hoc mode; and (3) said dynamic switching mode in which said data collection device dynamically switches between an infrastructure and ad hoc communication mode; said self healing component enabling said data collection device to (i) monitor data throughput of said device; and (ii) change a present mode of said data collection device from said present communication operating mode to another of said candidate communication operating modes in response to said throughput monitoring; and a packet content discriminator discriminating whether data packets transmitted utilizing said radio transceiver are decoded message data packets or image frame data packets.

In addition, there is provided (L), a portable bar code reading device for incorporation in a system having an access point wireline connected to a local server and at least one peer data collection device, said data collection device comprising: an imaging assembly including a two dimensional solid state image sensor array and a lens focusing an image onto said solid state image sensor array; a radio transceiver; a housing, wherein said identification decode unit and said radio transceiver unit are supported by said housing, wherein said housing is one of a hand held housing and a re-mountable housing; and a dynamic access module enabling said data collection device to (i) determine whether said data collection device is in range said access point, and (ii) determine whether said data collection device is in range of said peer data collection device, said dynamic access module further enabling said data collection device to receive data packets from said access point and route payload data of said data packets to said peer device if said data collection device determines that it is in range of both of said access point and said peer device.

In addition, there is provided (M), a data collection system comprising: first, second, and third portable data collection devices, D1, D2, and D3, each portable data collection device being separately housed and having an encoded information reader unit selected from the group consisting of a bar code reader unit, an RFID reader unit and a credit/debit card reading unit, and each being capable of operation in (a) infrastructure mode; (b) ad hoc mode and (c) dynamic switching mode in which a data collection device dynamically switches between infrastructure mode and ad hoc mode; an access point, AP, said access point being adapted for wireline connection to a local wireline bus; wherein said data collection system is configured to support a transmission of a data packet along the hop sequence D1-D2-D3-AP in such manner that throughout a time that packet data is transmitted along said hop sequence D1-D2-D3-AP, said first and second data collection devices D1 and D2 remain in ad hoc mode while said third data collection device, D3, dynamically switches between infrastructure mode and ad hoc mode.

In addition, there is provided (N), a data collection device for operation in a data communication system, having a local server and an access point configured for wireline connection to said local server, said data collection device comprising: an encoded information reader unit selected from the group consisting of a bar code reader unit, an RFID reader unit, and a credit card reader unit, said encoded information reader unit producing decoded out message data; a radio frequency transceiver; a portable housing supporting said radio frequency transceiver and components of said encoded information reader; a microphone; a Voice Over-Internet Protocol (VOIP) encoder/decoder receiving and processing an analog signal output of said microphone, said data collection device being configured to generate VOIP data packets for transmission utilizing said radio transceiver by processing a voice analog signal output from said microphone; wherein said data collection device is configured to send a request to said access point to buffer data packets addressed to said data collection device, said data collection device further being configured to operate in a mode of operation in which said data collection device broadcasts at least one of a routing table data packet and a Route Request (RREQ) data packet; wherein said data collection device further includes a data packet content discriminator discriminating whether a data packet transmitted by said data collection device is (a) a VOIP data packet or (b) a data packet containing said decoded output message data.

There is also provided the data collection device of (N), wherein said data packet content discriminator examines data packets buffered for wireless transmission by said data collection device.

There is also provided the data collection device of (N), wherein said data packet content discriminator receives a data content identifier from a control circuit of said data collection device.

There is also provided the data collection device of (N), wherein said data collection device further includes a plurality of selectable self-routing algorithm modules, and wherein said data collection device activates one of said plurality of selectable self routing algorithm modules based upon an output provided by said data packet content discriminator.

While the present invention has necessarily been described with reference to a number of specific embodiments, it will be understood that the true spirit and scope of the present invention should be determined only with reference to claims that can be supported by the present specification.

What is claimed:

1. A method of providing network connectivity within a data collection system comprising a server, an access point communicatively coupled to the server, and a portable data collection device residing outside of a communication range of the access point, the method comprising:
   introducing a new communication device within a communication range of the portable data collection device, the new communication device configured to receive data packets from the portable data collection device and to route payload data of the data packets to the access point if the new communication device determines that it is in range of both of the access point and the portable data collection device; and
   establishing network communications between the portable data collection device and the server, responsive to detecting a presence of the new communication device within a communication range of the portable data collection device.

2. The method of claim 1, wherein the new communication device is further configured to receive data packets from the access point and route payload data of the data packets to the portable data collection device if the new communication device determines that it is in range of both of the access point and the portable data collection device.

3. The method of claim 1, wherein the new communication device is disposed within a portable housing configured to be replaceable mounted on a fixed structure.

4. The method of claim 1, further comprising the step of the new communication device broadcasting routing table data including at least one network address.

5. The method of claim 1, wherein the new communication device is configured to operate in an infrastructure mode if the new communication device is within a communication range of the access point only;
   wherein new communication device is further configured to operate in an ad hoc mode if the new communication device is within a communication range of the data collection device; and
   wherein the new communication device is further configured to operate in dynamic switching mode to dynamically switch between an infrastructure mode and an ad hoc mode if the new communication device determines that the new communication device is within communication ranges of both the access point and the data collection device.

6. The method of claim 1, wherein the new communication device is configured to operate in a present communication operating mode, the communication operating mode selected from the candidate group consisting of: (a) an infrastructure mode; (b) an ad hoc mode; and (c) a dynamic switching mode in which the new communication device dynamically switches between an infrastructure and ad hoc communication mode; and
   wherein the new communication device is further configured to change the present communication operating mode to another mode of the candidate group of communication operating modes in response to monitoring data throughput of the new communication device.

7. A data collection system comprising:
   a server;
   an access point communicatively coupled to the server;
   a portable data collection device residing outside of a communication range of the access point;
   wherein the portable data collection device and the server are configured to establish a network communication responsive to the portable data collection device or the server detecting a presence of a new communication device within a communication range of the portable data collection device;
   wherein the new communication device is configured to receive data packets from the portable data collection device and route payload data of the data packets to the access point if the new communication device determines that it is in range of both of the access point and the portable data collection device.

8. The data collection system of claim 7, wherein the new communication device is further configured to receive data packets from the access point and route payload data of the data packets to the portable data collection device if the new communication device determines that it is in range of both of the access point and the portable data collection device.

9. The data collection system of claim 7, wherein the new communication device is disposed within a portable housing configured to be replaceable mounted on a fixed structure.

10. The data collection system of claim 7, wherein the data collection device comprises at least one of: (i) an imaging assembly including a two dimensional solid state image sensor array and a lens focusing an image onto the solid state image sensor array, (ii) an encoded information reader unit selected from the group consisting of a bar code decode unit, an RFID reader unit and a credit/debit card reader unit, and (iii) a Voice Over-Internet Protocol (VOIP) encoder/decoder configured to receive and process an analog signal output of a microphone.

11. The data collection system of claim 7, wherein the new communication device is configured to broadcast routing table data including at least one network address.

12. The data collection system of claim 7, wherein the new communication device is configured to operate in an infrastructure mode if the new communication device is within a communication range of the access point only;
   wherein the operate the new communication device is further configured to operate in an ad hoc mode if the new communication device is within a communication range of the data collection device; and
   wherein the new communication device is further configured to operate in dynamic switching mode to dynamically switch between an infrastructure mode and an ad hoc mode if the new communication device determines that the new communication device is within communication ranges of both the access point and the data collection device.

13. The data collection system of claim 7, wherein the new communication device is configured to operate in a present communication operating mode, the communication operating mode selected from the candidate group consisting of: (a) an infrastructure mode; (b) an ad hoc mode; and (c) a dynamic switching mode in which the new communication device dynamically switches between an infrastructure and ad hoc communication mode; and
   wherein the new communication device is further configured to change the present communication operating mode to another mode of the candidate group of communication operating modes in response to monitoring data throughput of the new communication device.

14. A data collection system comprising:
   a server;
   an access point communicatively coupled to the server;
   a first portable data collection device in communication with the access point;
   a second portable data collection device residing outside of communication ranges of both the first portable data collection device and the access point;
   wherein the second portable data collection device is configured to establish network communications with the server responsive to detecting a presence of a new communication device within a communication range of the second portable data collection device;
   wherein the new communication device is configured to receive data packets from the second portable data collection device and route payload data of the data packets to the access point if the new communication device determines that it is in range of both of the access point and the second portable data collection device, the new communication device further configured to receive data packets from the second portable data collection device and route payload data of the data packets to the first portable data collection device if the new communication device determines that it is in range of both of the first portable data collection device and the second portable data collection device.

15. The data collection system of claim 14, wherein the new communication device is further configured to receive data packets from the access point and route payload data of the data packets to the second portable data collection device if the new communication device determines that it is in range of both of the access point and the second portable data collection device, the new communication device further configured to receive data packets from the first portable data collection device and route payload data of the data packets to the second portable data collection device if the new communication device determines that it is in range of both of the first portable data collection device and the second portable data collection device.

16. The data collection system of claim 14, wherein the new communication device is disposed within a portable housing configured to be replaceable mounted on a fixed structure.

17. The data collection system of claim 14, wherein at least one of the first data collection device and the second data collection device comprises at least one of: (i) an imaging assembly including a two dimensional solid state image sensor array and a lens focusing an image onto the solid state image sensor array, (ii) an encoded information reader unit selected from the group consisting of a bar code decode unit, an RFID reader unit and a credit/debit card reader unit, and (iii) a Voice Over-Internet Protocol (VOIP) encoder/decoder configured to receive and process an analog signal output of a microphone.

18. The data collection system of claim 14, wherein at least one of the first data collection device and the new communication device is configured to broadcast routing table data including at least one network address.

19. The data collection system of claim 14, wherein the new communication device is configured to operate in an infrastructure mode if the new communication device is within a communication range of the access point only;

wherein the new communication device is further configured to operate in an ad hoc mode if the new communication device is within a communication range of the second data collection device; and wherein the new communication device is further configured to operate in dynamic switching mode to dynamically switch between an infrastructure mode and an ad hoc mode if the new communication device determines that the new communication device is within communication ranges of both the access point and the second data collection device.

20. The data collection system of claim 14, wherein the new communication device is configured to operate in a present communication operating mode, the communication operating mode selected from the candidate group consisting of: (a) an infrastructure mode; (b) an ad hoc mode; and (c) a dynamic switching mode in which the new communication device dynamically switches between an infrastructure and ad hoc communication mode; and wherein the new communication device is further configured to change the present communication operating mode to another mode of the candidate group of communication operating modes in response to monitoring data throughput of the new communication device.

\* \* \* \* \*